US009270584B2

(12) United States Patent
Hui et al.

(10) Patent No.: US 9,270,584 B2
(45) Date of Patent: Feb. 23, 2016

(54) DIVERSE PATHS USING A SINGLE SOURCE ROUTE IN COMPUTER NETWORKS

(75) Inventors: Jonathan W. Hui, Foster City, CA (US); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 230 days.

(21) Appl. No.: 13/406,823

(22) Filed: Feb. 28, 2012

(65) Prior Publication Data

US 2013/0223237 A1 Aug. 29, 2013

(51) Int. Cl.
*H04L 12/721* (2013.01)
*H04L 12/707* (2013.01)
*H04W 84/18* (2009.01)

(52) U.S. Cl.
CPC ............... *H04L 45/34* (2013.01); *H04L 45/24* (2013.01); *H04W 84/18* (2013.01)

(58) Field of Classification Search
None
See application file for complete search history.

(56) References Cited

U.S. PATENT DOCUMENTS

| 5,721,820 | A | 2/1998 | Abali et al. |
| 7,123,620 | B1 | 10/2006 | Ma |
| 7,453,884 | B2 | 11/2008 | Ma |
| 7,701,845 | B2 | 4/2010 | Bryant et al. |
| 7,817,636 | B2 | 10/2010 | Sankaran |
| 7,839,856 | B2 | 11/2010 | Sinha et al. |
| 2002/0181485 | A1* | 12/2002 | Cao ........................... H04J 3/14 370/419 |
| 2009/0073921 | A1* | 3/2009 | Ji et al. .................... H04L 45/00 370/328 |
| 2009/0228575 | A1 | 9/2009 | Thubert et al. |
| 2011/0007629 | A1* | 1/2011 | Atlas et al. .................... 370/225 |
| 2011/0019686 | A1* | 1/2011 | Seok ..................... H04W 40/26 370/428 |
| 2011/0317696 | A1 | 12/2011 | Aldrin et al. |

FOREIGN PATENT DOCUMENTS

WO WO-2009017602 A1 2/2009

OTHER PUBLICATIONS

Finnie, et al., "Notification of Transmittal of the International Search Report and the Written Opinion of the International Searching Authority, or the Declaration", Patent Cooperation Treaty, May 17, 2013, 10 pages, PCT/US2013/028313, European Patent Office, Rijswijk, Netherlands.

(Continued)

*Primary Examiner* — Jason Mattis
*Assistant Examiner* — Adnan Baig
(74) *Attorney, Agent, or Firm* — Parker Ibrahim & Berg LLC; James M. Behmke; Stephen D. LeBarron

(57) ABSTRACT

In one embodiment, a source device determines a source route from itself to a destination device in a computer network, and forwards a first packet on the source route with the source route included within the first packet. In addition, the source device generates a second packet with the source route included within the second packet, the second packet also including an indication to cause one or more of a plurality of transit devices to forward the second packet to a reachable 1-hop neighbor of a device in the source route two hops away from the respective transit device. The source device may then forward the second packet itself, as do one the one or more transit devices on a diverse path based on the source route, to a particular reachable 1-hop neighbor of a particular device in the source route two hops away from the source (or transit) device.

22 Claims, 18 Drawing Sheets

(56) References Cited

OTHER PUBLICATIONS

Johnson, et al., "DSR: The Dynamic Source Routing Protocol for Multi-Hop Wireless Ad Hoc Networks", Internet Citation, 2001, 25 pages, XP002256390, URL:cite.nj.nec.com/johnson01dsr.html, Retrieved Oct. 2, 2003.

Vasseur, et al., "A Backward Recursive PCE-Based Computation (BRPC) Procedure to Compute Shortest Constrained Inter-Domain Traffic Engineering Label Switched Paths", IETF Network Working Group, Request for Comments 5441, Apr. 2009, 19 pages.

Winter, et al., "RPL: IPv6 Routing Protocol for Low Power and Lossy Networks", draft-ietf-roll-rpl-19, IETF Internet-Draft; Mar. 2011, 164 pages.

* cited by examiner

DIVERSE PATHS USING A SINGLE SOURCE ROUTE IN COMPUTER NETWORKS

TECHNICAL FIELD

The present disclosure relates generally to computer networks, and, more particularly, to diverse paths for multi-path forwarding in source routing computer networks.

BACKGROUND

Low-power and Lossy Networks (LLNs), e.g., sensor networks, have a myriad of applications, such as smart grid, smart cities, home and building automation, etc. Various challenges are presented with LLNs, such as lossy links, low bandwidth, battery operation, low memory and/or processing capability, etc. Large-scale IP smart object networks pose a number of technical challenges. For instance, the degree of density of such networks (such as Smart Grid networks with a large number of sensors and actuators, smart cities, or advanced metering infrastructure or "AMI" networks) may be extremely high: it is not rare for each node to see several hundreds of neighbors. Also, links are usually shared (e.g., using wireless mesh or powerline communication (PLC) networks) and provide very limited capacity (from a few Kbits/s to a several dozen of KBits/s).

The computation of diverse paths is a well-known technical challenge in networks using distance vector routing protocols, such as many LLN routing protocols. The ability to build diverse paths is important for the Internet of Things (IoT) for a number of critical/real-time applications where "1+1" techniques consisting of duplicating critical packets and sending them along diverse paths is a strong requirement. Indeed, for such packets, links are so lossy that sending a single copy along a path has a high probability of being lost (and being retransmitted, which involves additional delays), especially when the path diameter increases, particularly since the path's Packet Error Rate (PER) increases exponentially with the path length. Note that the computation of diverse paths may also be used to load-balance traffic flows across diverse paths (not just for 1+1).

Because LLNs, as well as other networks, often operate with devices that have strict memory constraints, many networks use source routing to deliver packets to their destination. Source routing allows the network to concentrate routing state at one or a few more capable devices in the network (typically a border router). One method for multi-path forwarding with source routing is to discover and maintain multiple paths towards a destination at the source. Then when sending a packet, each copy of the packet includes a different source route. However, doing so is difficult and costly to do in practice. Distance vector routing protocols typically used with LLNs are not well-suited at building completely diverse paths. Using multi-path forwarding with source routing assumes that the routing protocol is capable of building multiple routes towards a single destination. If the routing protocol is not capable of doing this, then multi-path forwarding cannot be used.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
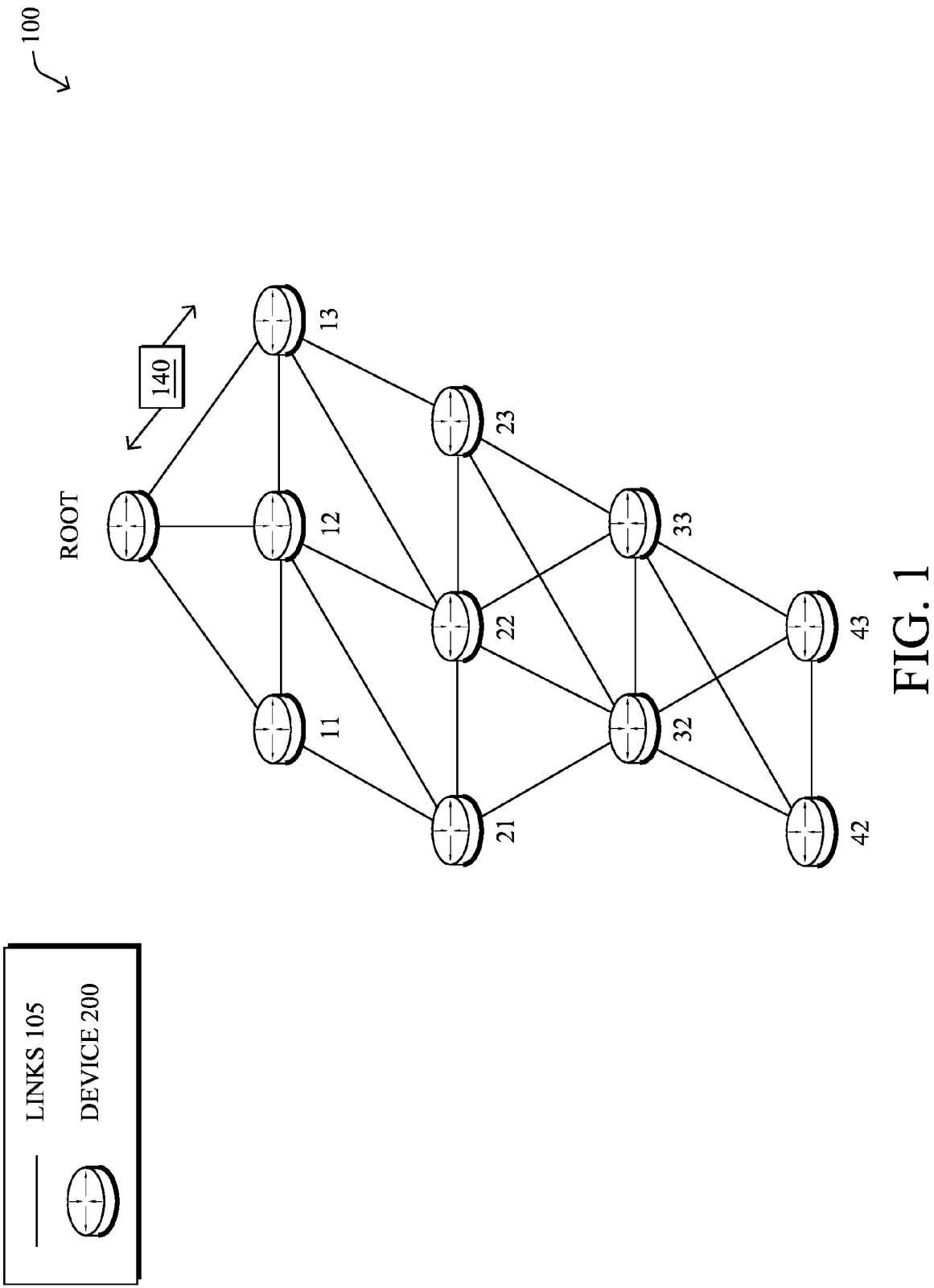
FIG. 1 illustrates an example computer network.

According to one or more embodiments of the disclosure, a source device determines a source route from itself to a destination device in a computer network, and forwards a first packet on the source route with the source route included within the first packet. In addition, the source device generates a second (or more) packet(s) with the source route included within the second packet, the second packet also including an indication to cause one or more of a plurality of transit devices to forward the second packet to a reachable 1-hop neighbor of a device in the source route two hops away from the respective transit device. The source device may then forward the second packet itself, as do one the one or more transit devices on a diverse path based on the source route, to a particular reachable 1-hop neighbor of a particular device in the source route two hops away from the source (or transit) device.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, "LBR," "11," "12," ... "43," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
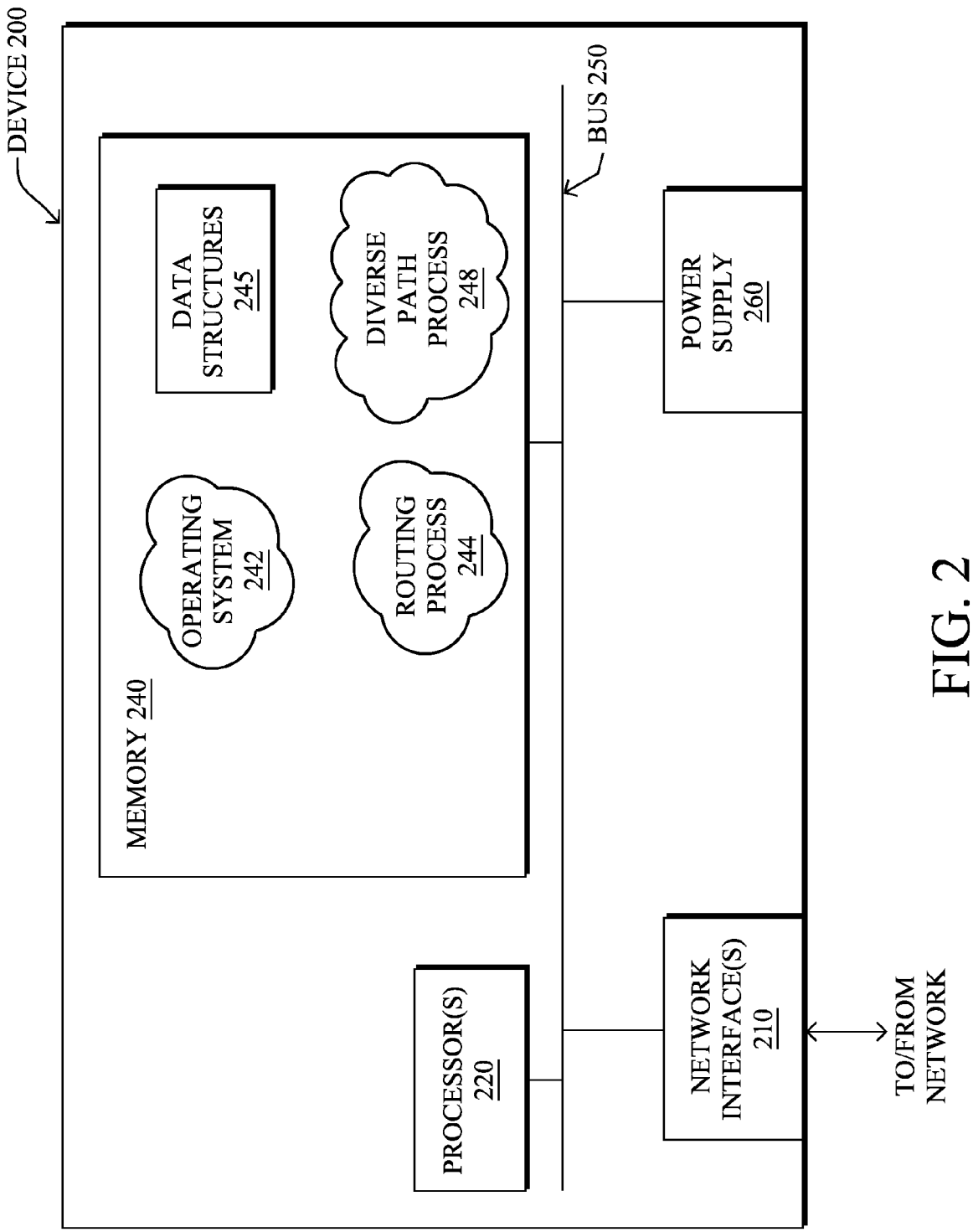
FIG. 2 illustrates an example network device/node.

FIG. 2 is a schematic block diagram of an example node/device 200 that may be used with one or more embodiments described herein, e.g., as any of the nodes/devices shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, and an illustrative diverse path process 248, as described herein. Note that while diverse path process 248 is shown in centralized memory 240, alternative embodiments provide for the process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Internet Draft, entitled "RPL: IPv6 Routing Protocol for Low Power and Lossy Networks"<draft-ietf-roll-rpl-19> by Winter, at al. (Mar. 13, 2011 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

As noted above, the computation of diverse paths is a well-known technical challenge in networks using distance vector routing protocols, such as many LLN routing protocols. The ability to build diverse paths is important for the Internet of Things (IoT) for a number of critical/real-time applications where multi-path forwarding techniques consisting of load-balancing traffic across diverse paths, or particularly duplicating critical packets and sending them along diverse paths, is a strong requirement. Indeed, for such packets, links are so lossy that sending a single copy along a path has a high probability of being lost (and being retransmitted, which involves additional delays), especially when the path diameter increases, particularly since the path's Packet Error Rate (PER) increases exponentially with the path length.

Said differently, supporting multi-path forwarding, such as redundancy protection techniques, e.g., "1:1" protection (where the diverse path is used only in response to detecting a failure of the primary path) or "1+1" protection (where two diverse packets are sent, one on the primary path and one on the/each diverse path), is an important factor in many LLNs making use of Distance Vector routing protocols. For some applications in particular, the delivery of a critical packet is an absolute requirement. As one illustrative example (among many), Industrial Automation has specified several classes of traffic:

Class 0: Emergency action—always a critical function;
Class 1: Closed-loop regulatory control—often a critical function;
Class 2: Closed-loop supervisory control—usually a non-critical function;
Class 3: Open-loop control—operator takes action and controls the actuator (human in the loop);
Class 4: Alerting—Short-term operational effect (for example, event-based maintenance);
Class 5: Logging and downloading/uploading—No immediate operational consequence (e.g., history collection, sequence-of-events, preventive maintenance).

Current LLN solutions typically provide adequate service for the monitoring classes 4 and 5, which have the lowest reliability and real-time requirements, and sometimes the non-critical portions of class 3. However, in order to provide reliable service for the higher classes of traffic, e.g., class 3 and above, redundancy protection techniques (using diverse paths) may be necessary in such networks.

As also noted above, because LLNs, as well as other networks, often operate with devices that have strict memory constraints, many networks use source routing to deliver packets to their destination. Source routing allows the network to concentrate routing state at one or a few more capable devices in the network (typically a border router). Any number of routing protocols may be used to build and maintain routing state at those nodes (e.g., RPL, DSR, etc.). One method for multi-path forwarding with source routing is to discover and maintain multiple paths towards a destination at the source. Then when sending a packet, each copy of the packet includes a different source route. However, doing so is difficult and costly to do in practice. Distance vector routing protocols typically used with LLNs (including both RPL and DSR) are not well-suited at building completely diverse paths. For example, while RPL does allow each device to report multiple parents in the DAG, doing so does not guarantee that there will be multiple distinct paths in the downward direction. Furthermore, reporting multiple parents consumes precious communication and memory resources that are highly constrained in LLNs. Using multi-path forwarding with source routing assumes that the routing protocol is capable of building multiple routes towards a single destination. If the routing protocol is not capable of doing this, then multi-path forwarding cannot be used.

Single Source Route Multi-Path Forwarding

The techniques herein provision on-demand diverse paths between two arbitrary nodes in a source routing computer network using only a single source route. In particular, the techniques allow a source/sender node to dynamically activate multi-path forwarding (e.g., load-balancing and/or redundancy protection) for a flow along a primary path, and generally rely on intermediate nodes to diversely forward the packets of the flow according to the single source route. For instance, by including an indicator that the source has enabled multi-path forwarding, the intermediate forwarders determine whether or not to enable path diversity when forwarding a source-routed message, and use the single source route as a guide for the diverse path(s). The techniques herein, notably, are agnostic to the underlying routing protocol.

Specifically, according to one or more embodiments of the disclosure as described in detail below, a source device determines a source route from itself to a destination device in a computer network, and forwards a first packet on the source route with the source route included within the first packet. In addition, the source device generates a second (or more) packet(s) with the source route included within the second packet, the second packet also including an indication to cause one or more of a plurality of transit devices to forward the second packet to a reachable 1-hop neighbor of a device in the source route two hops away from the respective transit device. The source device may then forward the second packet itself, as do one the one or more transit devices on a diverse path based on the source route, to a particular reachable 1-hop neighbor of a particular device in the source route two hops away from the source (or transit) device.

Illustratively, the techniques described herein may be performed by hardware, software, and/or firmware, such as in accordance with the diverse path process 248, which may contain computer executable instructions executed by the processor 220 (or independent processor of interfaces 210) to perform functions relating to the techniques described herein, e.g., in conjunction with routing process 244. For example, the techniques herein may be treated as extensions to conventional protocols, such as one or more illustrative routing protocols (e.g., RPL, DSR, etc.), and as such, may be processed by similar components understood in the art that execute those protocols, accordingly. It is worth noting that the techniques herein are not limited to distance vector routing protocols, but may be used by any routing protocol that may employ the use of source routes, whether as the only type of forwarding, or only as a portion of all network forwarding (e.g., where certain, but not all devices use source routing).

Note also that functionality of the diverse path process 248 may be specifically configured for whether the device is a source (originator) node, an intermediate (transit) node, or a destination (receiver) node. However, in an illustrative embodiment, each node 200 may be generally capable of functioning as any type of node/device, that is, depending upon the traversed path in question.

Operationally, the first component of the illustrative techniques herein is to dynamically determine, by source devices (senders) of traffic, when to trigger multi-path (diverse path) forwarding, such as for redundancy protection for critical traffic, e.g., for either "1:1" protection, "1+1" protection, or load-balancing, optionally for a specific period of time. That is, in contrast with many current approaches, the source device, such as the root device or any other device 200 in the network 100, first determines "on-the-fly" whether or not a packet flow requires multi-path forwarding. By detecting whether a packet flow meets certain defined criteria for multi-path forwarding, the techniques herein may generally provide that the techniques be used for a limited subset of all traffic (e.g., to reduce overhead in the network). In particular, the extra processing for the diverse path(s) as described below may be costly, thus the source may decide to limit the use of the techniques herein for very critical traffic.

This is, the decision to apply multi-path forwarding to particular traffic flows may be driven by policy according to matching specific criteria, such as various rules defining particular flow characteristics, specific scenarios or circumstances, etc. For example a specific set of events may make a specific notification extremely important, e.g., alerts, potentially for a specific amount of time. Such criteria/rules may be obtained from a network management server (NMS) or other management device, such as during the bootstrapping process, and may be dynamically updated, such as due to varying network conditions or varying application determinations (e.g., an indication from higher layer that a critical packet flow may be experiencing a low packet delivery rate, etc.). Note that critical packet flows are frequent in the IoT, to send a set of critical event information, download an urgent security patch on a remote device, etc.

Illustratively, example criteria to be met for multi-path forwarding may comprise, generally, load-balancing different packets of the flow, providing redundancy protection for the first packet by the second packet, and responding to a specific application to provide multi-path forwarding. More specifically, such criteria may comprise, among others, particular traffic types, priorities, or classes, particular applications sourcing the traffic, particular destination devices (such as an access control list (ACL)), destinations within a configured distance (e.g., more of a limiting criteria in addition to one or more other criteria), traffic during particular times, traffic during particular events, etc. In one specific embodiment, the criteria may even simply be to use the techniques herein for multi-path forwarding in response to a source device being configured to be able to generate critical packets, generally (e.g., a device whose sole purpose is to generate critical alarms).

Figure 3:
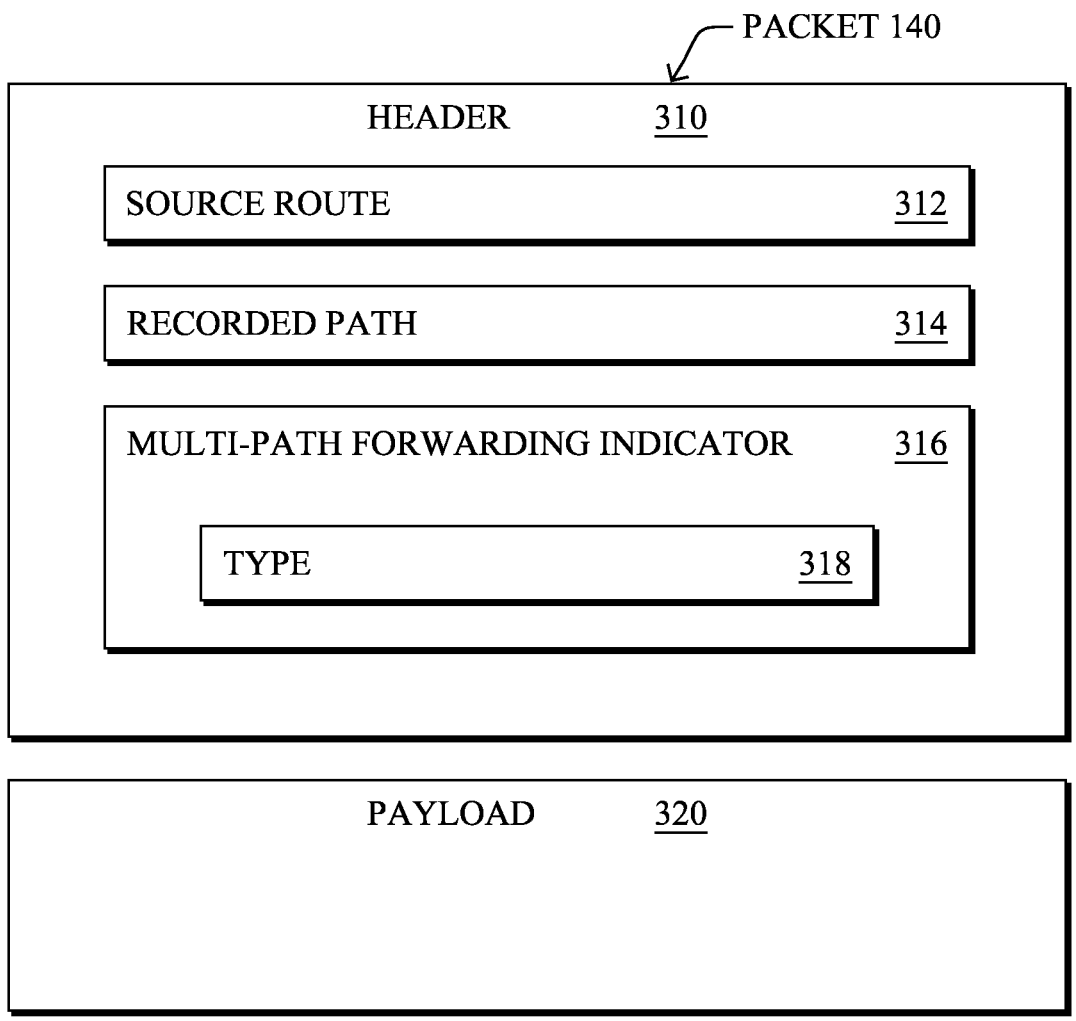
FIG. 3 illustrates an example packet format.

Once the source device determines that multi-path forwarding is required for a packet flow, it generates a plurality of packets 140 to be forwarded according to the techniques herein. For instance, FIG. 3 illustrates an example (and simplified) packet 140, that may generally comprise a header 310 used to forward the packet 140 according to a source route 312, and corresponding payload 320, as will be understood by those skilled in the art. Generally, the header 310 (e.g., an IPv6 Hop-by-Hop header) of the packet 140 may also carry a recorded path field 314, and according to the techniques herein, a multi-path forwarding indicator 316 (indication 316, along with other fields 318 as described herein), such as a bit, flag, or TLV, that indicates to one or more transit devices (as well as the destination device) that the techniques herein for multi-path forwarding have been triggered for the corresponding (identified) packet flow, namely, requesting single source route based diverse path forwarding by the transit devices.

Notably, when multi-path forwarding is not enabled, the source need not include the indication 316 and builds and forwards the source routed packet 140 in a generally conventional manner. In IPv6, this is typically done by including an IPv6 routing header 310 with a list of IPv6 addresses 312 that specify the path towards the destination. Forwarding a source-routed packet without multi-path forwarding occurs as usual by transit devices, by delivering the packet to each IPv6 address in order.

Figure 4:
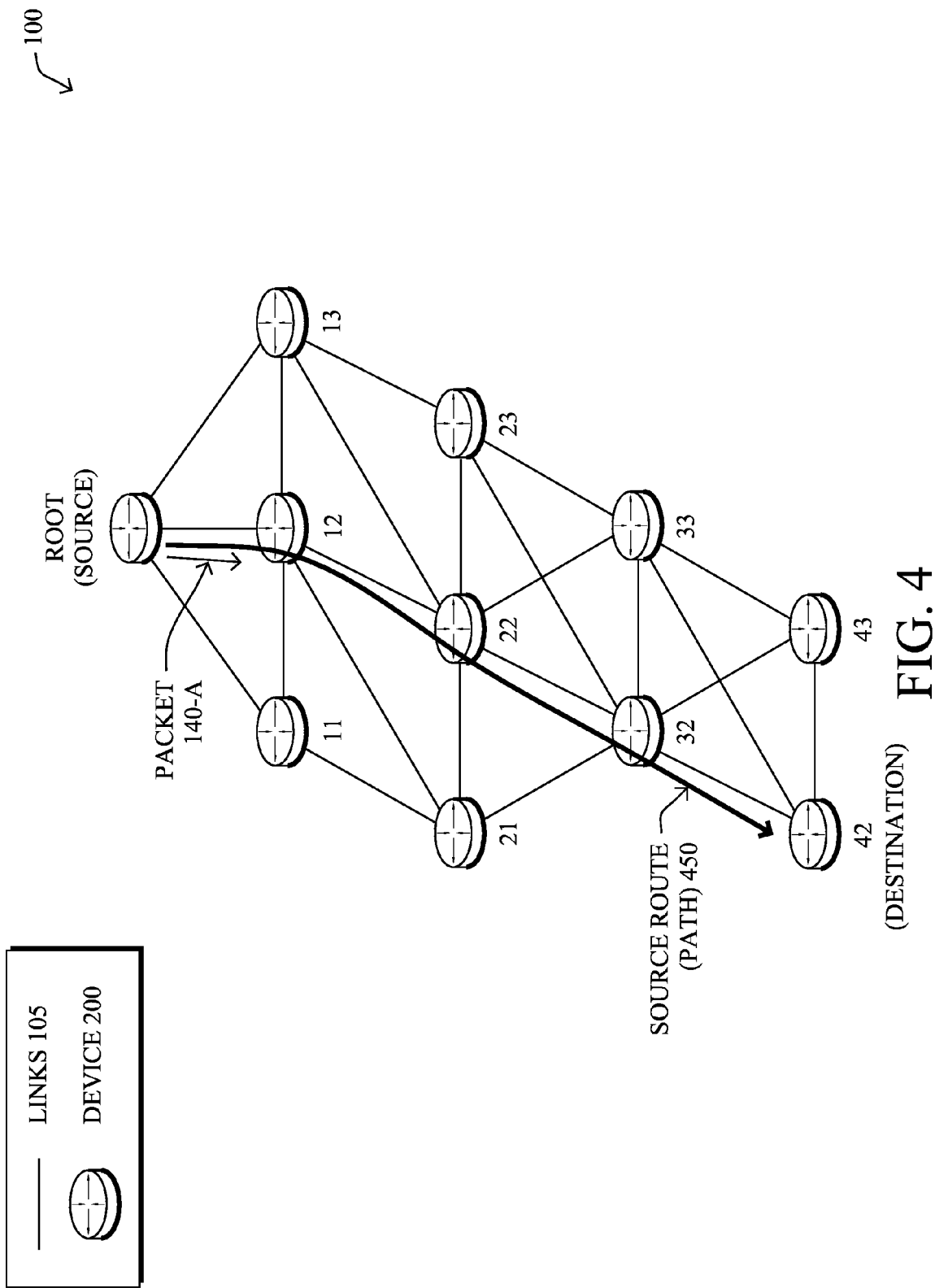
FIG. 4 illustrates an example source-routed path.

FIG. 4 illustrates an example source-routed path, or simply a "source route" 450, such as from the root node as a source device to node 42 as a destination device along the path ROOT-12-22-32-42, as shown, where nodes 12, 22, and 32 are transit (or intermediate) devices. As such, when the source device (root) determines a source route 450 from itself to a destination device (node 42) in a computer network 100, the source device may forwarding the source routed packet "140-A" on the source route 450, including the associated source route 312.

When a source device decides to enable multi-path forwarding (for load-balancing, redundancy protection, etc.) on a source routed packet 140, according to the techniques herein the packet may includes the multi-path forwarding indicator option 416 to indicate that the packet will be forwarded using multi-path forwarding as described herein.

In particular, for multi-path forwarding, the source device may generate N copies of the packet (e.g., one or more copies of the first source-routed packet 140-A), each including the same source route as the first packet 140-A above, but also including the indication 316, which illustratively causes transit devices to forward the N-th packet to a reachable 1-hop neighbor of a device in the source route 312 two hops away from the respective transit device. Illustratively, the indication 316 may comprise a distinct indication, such as a different sequence value (e.g., starting with 0 for the first packet 140-A to be source routed), to distinguish different copies of the same packet.

Notably, the number of copies N may be fixed or determined dynamically based on the reliability requirements and/or perceived network conditions. For instance, when dynamically computed, the source device may determine the number N from a network management device, such as information provided by central intelligence controller (CIC) or network management server (NMS). For example, such information may be based on packet delivery success rates or other network metrics, in which case, the computed value for N may be provided to a node (e.g., upon bootstrapping) and may be specific to the node according to its location in the network 100, or it may be common to all nodes in the network. In yet another embodiment, the value for N computed by the NMS/CIC may also be sent to the root node (or border router), which would in turn broadcast the value into the network 100.

According to the techniques herein, when forwarding a packet 140, the network device (transit device) processes the indication 316 to discover that multi-path forwarding has been enabled on this packet. The transit device may then extract the distinct indicator (e.g., sequence value) to determine how to forward the packet. Illustratively, when the sequence value is 0 (or some other default value), the transit device may simply forward the packet 140 (140-A, specifically) to the next-hop whose address is specified in the source-route header 312 (thus along the preferred path 450 specified in the source route by the source device according to the routing protocol in use), as shown in FIG. 4. In particular, if the current position of the transit (or source) device within the source route is "K," the forwarding device sends the packet 140 to the next-hop node in position "K+1" of the source route 312.

When the indication 316 is set to cause multi-path forwarding to occur, such as when the illustrative sequence value is non-zero, the transit node may or may not utilize the next-hop specified in the K+1 position of the source route 312. Instead, the transit device determines the 1-hop neighbors of the device specified two hops away in the source route (e.g., entry K+2), and selects among those 1-hop routers to advance the current position of the source route (e.g., may decrement an illustrative "segments left" value in IPv6 before forwarding the packet. Said differently, each device forwarding the "diverse path" packet sends the packet to a reachable 1-hop neighbor of a device in the source route 312 that is two hops away from the respective transit device.

Figure 5A:
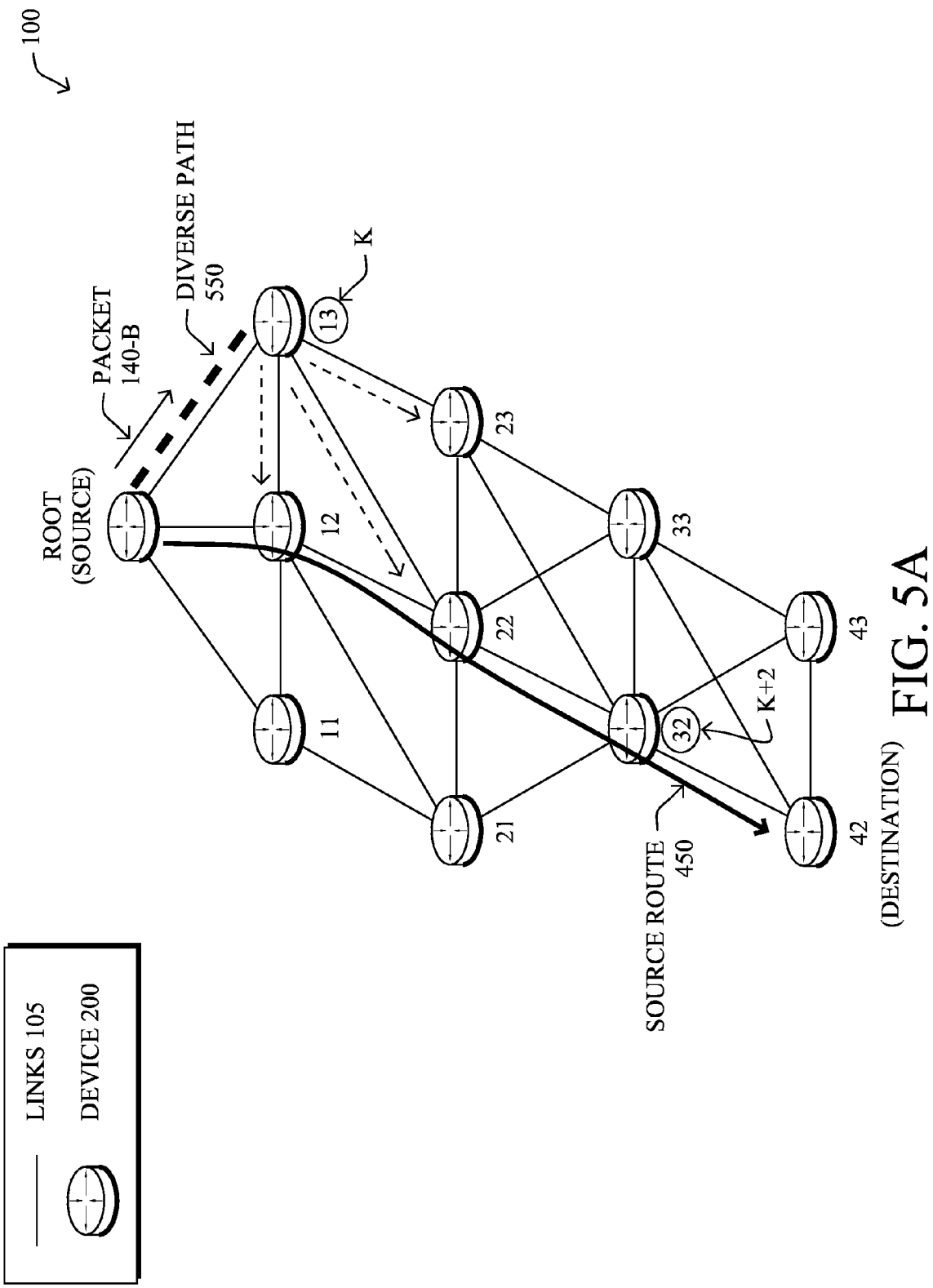
FIGS. 5A-5C illustrate an example of diverse path forwarding based on a single source route.
Figure 5B:
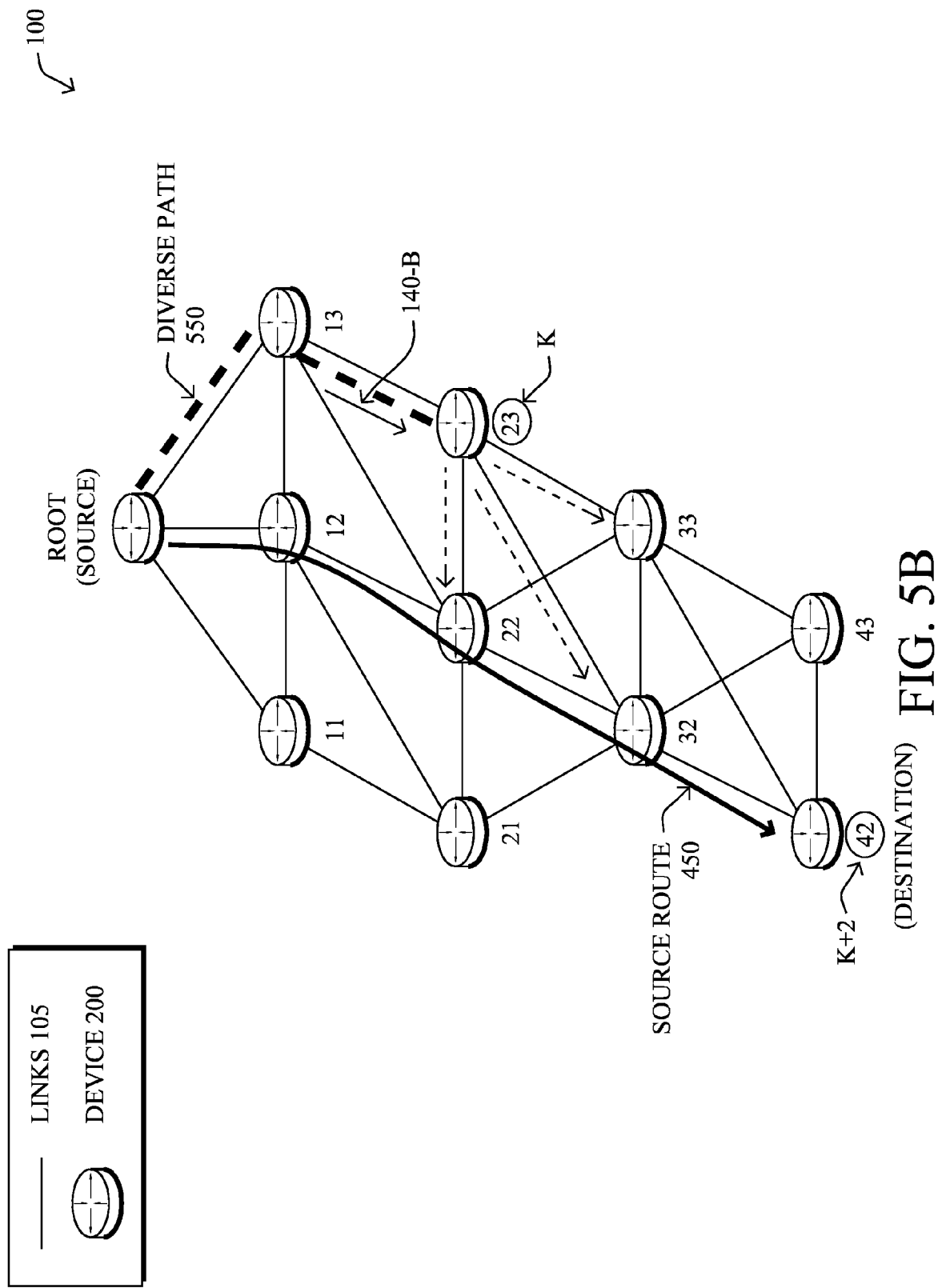
Figure 5C:
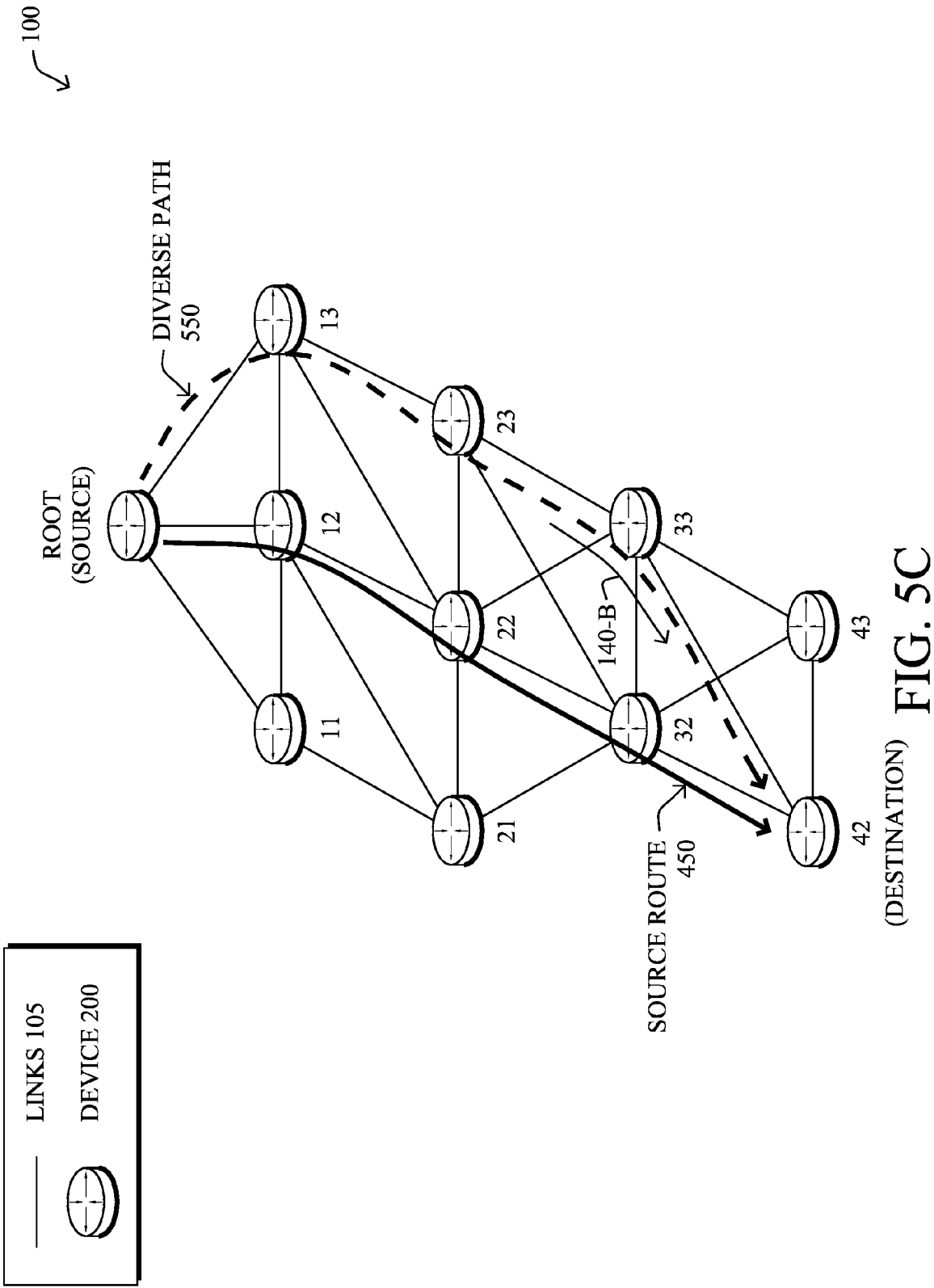

The techniques herein may be better understood with reference to an example, such as that shown in FIGS. 5A-5C. As shown in FIG. 5A, with the original source route 450 set as ROOT-12-22-32-42, as in FIG. 4 above, when the source device first forwards another packet 140-B (e.g., a copy of the source-routed packet 140-A for redundancy protection, or a different packet for load-balancing, etc.), it processes the source route and determines that node 13 is a reachable (to the source device) 1-hop neighbor of the device on the source route that is two hops away, i.e., a 1-hop neighbor of node 22. As such, the source node may forward the packet 140-B to node 13, and begins the creation of diverse path 550. Note that node 11 is not a 1-hop neighbor of node 22, and hence is not an option according to the techniques herein as an alternate transit node.

When node 13 receives the packet 140-B, it processes the indication 316 and the corresponding source route 312. Accordingly, node 13, as a transit device, may determine that node 12 (on the source route) and node 23 (not on the source route) are 1-hop neighbors of node 32, and may select node 23 to receive the forwarded packet 140-B to continue the diverse path 550. (Note that various routing protocol techniques may provide for the selection of node 23 versus node 12, or any other nodes not shown, such as those techniques described below based on link-diverse or node-diverse forwarding, in addition to conventional routing protocol selections.)

As shown in FIG. 5B, when node 23 process the packet 140-B, it determines that node 22 and node 33 are 1-hop neighbors of node 42, the device on the source route that is two hops away from node 23. If node 23 selects node 33, then as shown in FIG. 5C, node 33 may complete the diverse path 550 by sending the packet 140-B to the destination device, node 42. As a result, the packet 140-B follows a diverse path 550 from the source device (e.g., root) to the destination (e.g., node 42) that does not visit nodes 12, 22, or 32 as specified in the source route, namely, following the diverse path ROOT-13-23-33-42.

Note that when the sequence value is zero, transit nodes (along the source route) forward the packet 140-A to the address specified in position K+1 according to a strict source route strategy, where the packet visits every entry in the list, as noted above. However, when the sequence value is non-zero, forwarding the packet 140-B to neighbors of the address specified in position K+2 allows a device to route around a link failure that may occur when forwarding from K to K+1 or K+1 to K+2. Furthermore, by only forwarding to neighbors of K+2, transit devices continue to forward the packet 140-B using the source route as a guide.

It is important to note that this is quite different from "loose source routing." Loose source routing requires the packet to visit the routers listed in the source route 312, but is "loose" because the packet may visit additional routers along the way. With the techniques herein, a packet may visit none of the transit devices (intermediate routers) listed in the source route. At each hop along the way, a device need only forward the packet to a 1-hop neighbor of entry K+2, and advance the current position of the source route. As a result, the packet may traverse routers that are all 1-hop from an entry listed in the source route, but never actually traverses any routers listed in the source route. (Note also that providing a mechanism that allows a packet to avoid traversing any routers listed in the source route is critical to support node-diverse paths, where loose source routing supports only link-diverse paths, not node-diverse paths.)

According to one or more embodiments herein, the distinct indications 316 used (e.g., the sequence values) may provide a source of entropy to selection of the reachable 1-hop neighbor by a particular transit device in the event the particular transit device receives more than one of the N packets. For instance, the value 316 may simply be an index into a sorted list of valid 1-hop neighbors, e.g., node 13 selecting between node 12 and node 23 based on whether the sequence is odd or even. In another embodiment, the value may be used a hash input, where a hash output of the sequence may be used to also index into a sorted list of valid 1-hop neighbors. In yet another embodiment, the transit device may cache the sequence and next-hop destination, i.e., an indication/1-hop-neighbor pair, for previously seen packets 140, and may then select 1-hop neighbors that have not been used before when receiving another of the N packets at the same transit device (that is, each distinct indication is paired with a distinct 1-hop neighbor).

A goal of the distinct indication embodiments above is to allow the multi-path forwarding indication value 316 (e.g., sequence value) to thus provide a source of entropy is to help ensure that the different packets (e.g., copies for redundancy protection) traverse different paths. In other words, the sequence value may be used to help ensure that devices make different forwarding decisions for different packets of the flow (e.g., different copies of the same packet). Having devices perform different forwarding decisions allows each hop to utilize different links when forwarding a packet whenever possible, and the end result is that a packet should traverse different links (if available), and, as a result, should thus traverse diverse paths.

Since there may be minimal routing state maintained at the transit nodes (one illustrative purpose for the use of source routing), it is also important to explain how device resolve addresses of neighbors up to two hops away. In particular, according to the techniques herein, when not following the strict source route (e.g., the sequence value 316 is non-zero), the transit device is restricted to using next-hops that are 1-hop neighbors of both the transit node currently processing the packet and entry K+2 of the source route. As a result, a transit device need only determine which of its local neighbors (1-hop neighbors) also have entry K+2 as a neighbor.

Figure 6A:
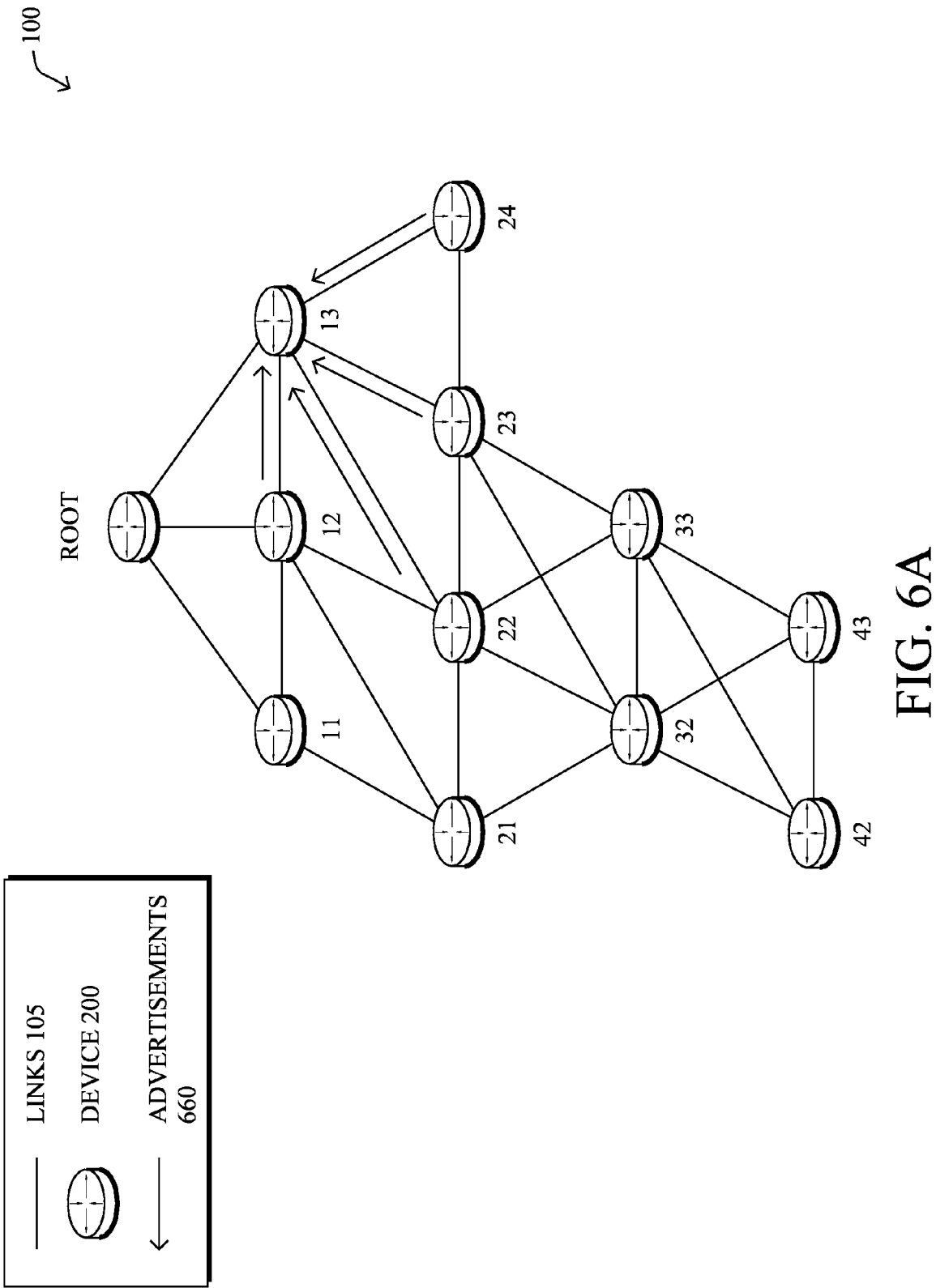
FIGS. 6A-6C illustrate examples of topology building.
Figure 6B:
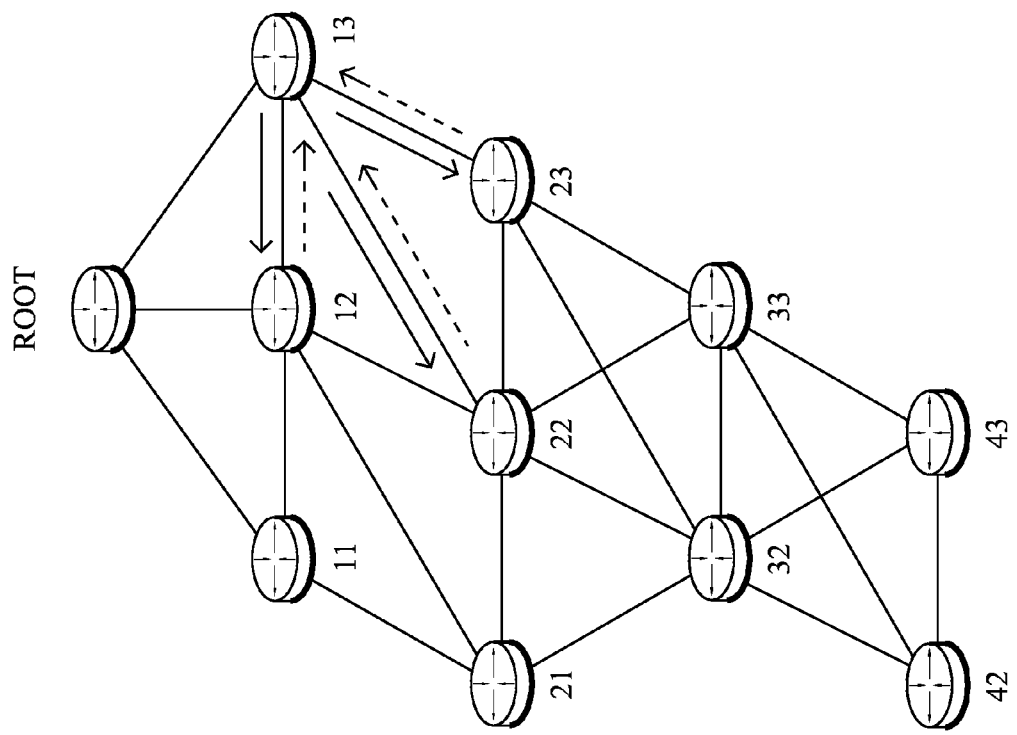

There are multiple ways a device can determine such neighbors. In one embodiment, a shown in FIG. 6A, devices may proactively advertise their 1-hop neighbors (advertisements 660), thus building 2-hop neighborhood information at each node based on the received advertisements from the local neighbors. In another embodiment, as shown in FIG. 6B, devices may send a query 670 asking which neighbors have entry K+2 as a neighbor, receiving responses 675, in turn, thus determining the two-hop topology based on responses to specific requests to the local neighbors.

Figure 6C:
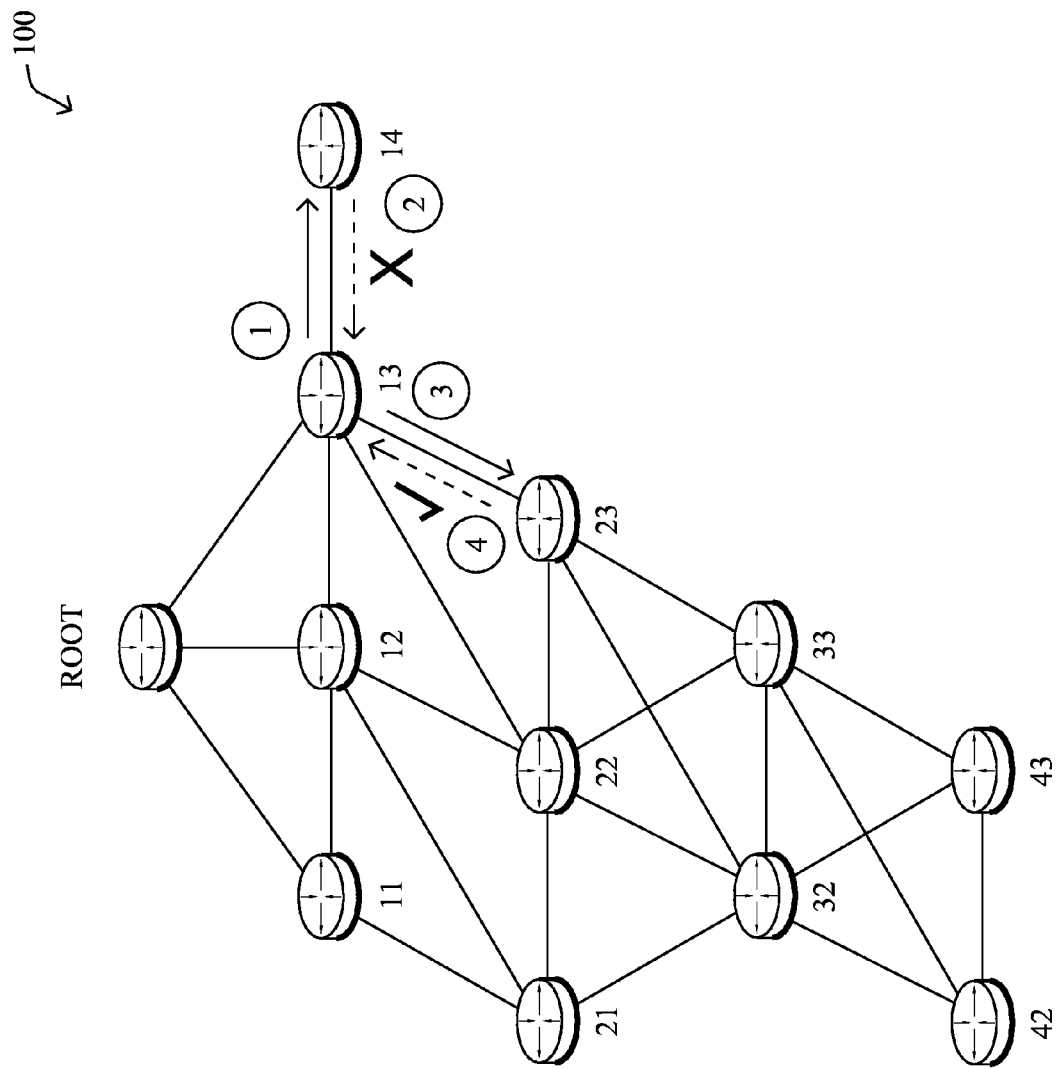

In yet another embodiment, as shown in FIG. 6C, a transit device (e.g., node 13) may try each local neighbor one at a time, where if a local neighbor (e.g., node 14) is not a 1-hop neighbor of the device in the source route two hops away from the transit device (e.g., node 32), then the local neighbor returns an error message to the transit device. That is, the transit device may optimistically forward a packet to a neighbor, where if that neighbor does not have entry "K+1" (e.g., node 32) as a neighbor (not "K+2" since the previous (K-th) transit device has advanced the current pointer), the chosen neighbor (node 14) could return the packet (or error message) back to the K-th device (node 13) and reset the current pointer to K. The transit device may then try again with a different neighbor (e.g., node 23). An acknowledgement may or may not be returned by a successful neighbor selection.

Figure 7A:
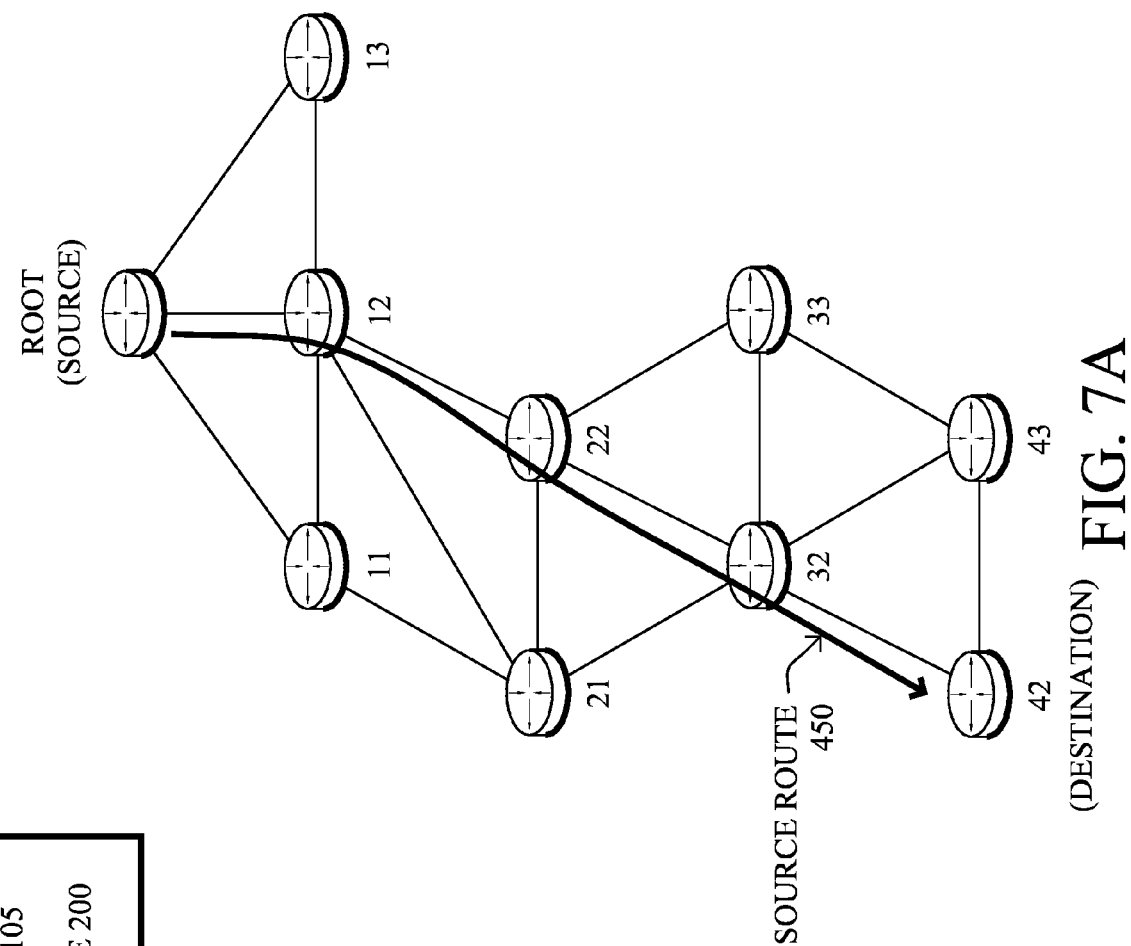
FIGS. 7A-7B illustrate an example of link-diverse path forwarding.
Figure 7B:
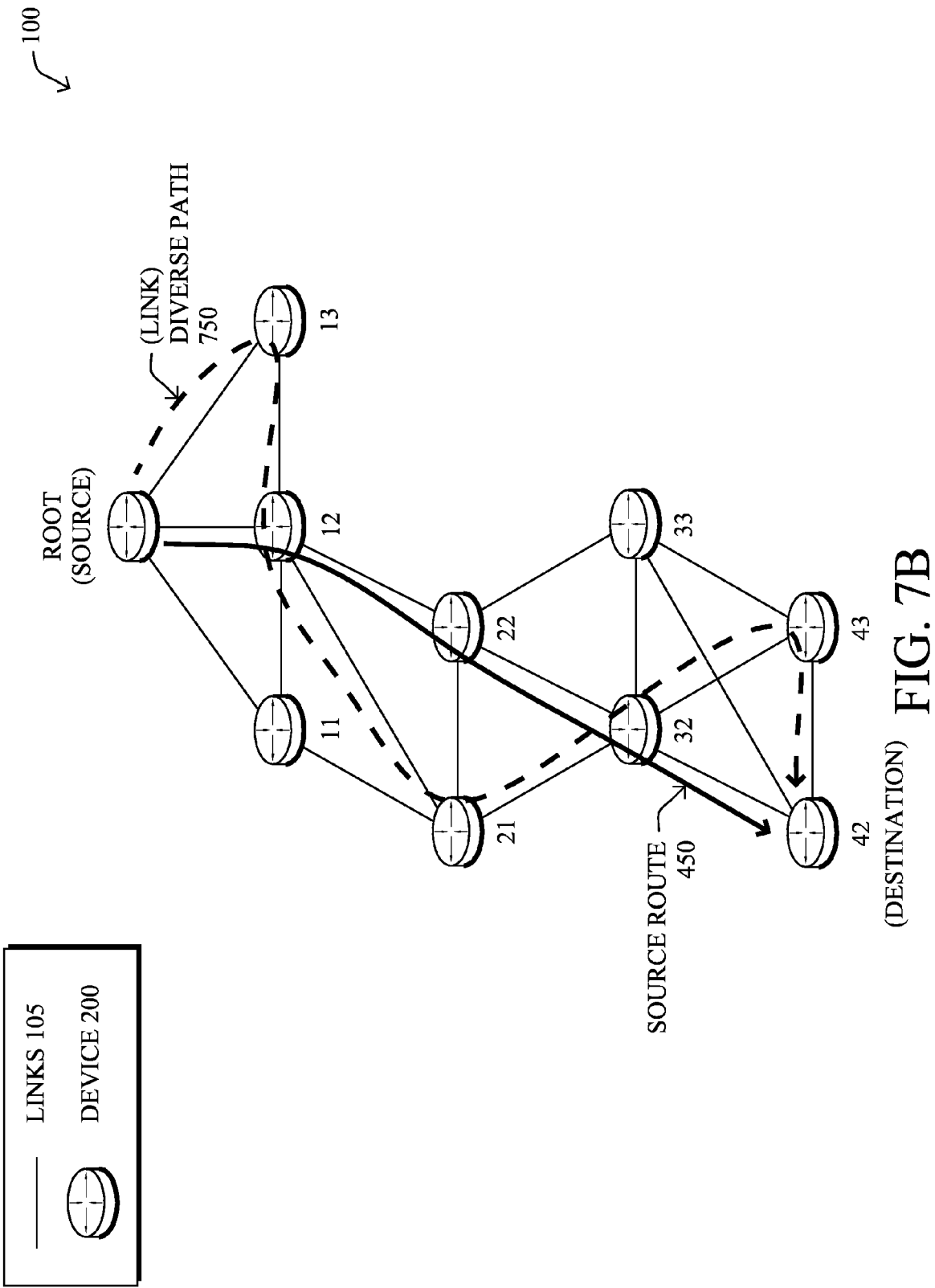

Note that a property of forwarding a source-routed packet using 1-hop neighbors of position K+2 is that a packet may visit all entries in the source route, a subset of entries in the source route, or none of the entries between the source and destination (such as shown in FIG. 5C above). The source route simply serves as a guide to reach the destination and the multi-path forwarding indication 316 (e.g., sequence value) serves as an indication of what path to utilize. This may lead to partially diverse routes, which is perfectly acceptable. For example, as shown in FIGS. 7A-7B, certain topologies (e.g., with node 23 removed and certain other links as shown in FIG. 7A) may demonstrate instances where the reachable 1-hop neighbor is actually another device in the source route, i.e., as a "prior-hop" to the device two hops away from the transit device. As shown in FIG. 7B, therefore, a resultant diverse path 750, based on the source route 450, may occasionally share a node along the source route, e.g., ROOT-13-12-21-32-43-42. In some cases, completely diverse paths that do not share any links may not be possible depending on the topology (e.g., if node 43 were not available, the final link of both paths would have to be 32-42), and various policies for tolerance of that fact may be configured on the devices, accordingly.

In accordance with one or more specific embodiments, if specific granularity is required, a second bit/indicator called "type" 318 in FIG. 3 above is defined that specifies whether the diverse path should be created as a link-diverse path or a node-diverse (i.e., link+node-diverse) path. When based on link-diversity, devices forwarding packets with a non-zero sequence value may forward the packet to respective reachable 1-hop neighbor nodes listed in the source route. When based on node-diversity, devices forwarding packets with a non-zero sequence value are not allowed to forward the packet to 1-hop neighbor nodes listed in the source route whenever possible. Note that in the later case, if no node-diverse paths can be found, a fall-back option may be to use a link-diverse path (and optionally record that fact in an error log or notification to the source device).

Figure 8A:
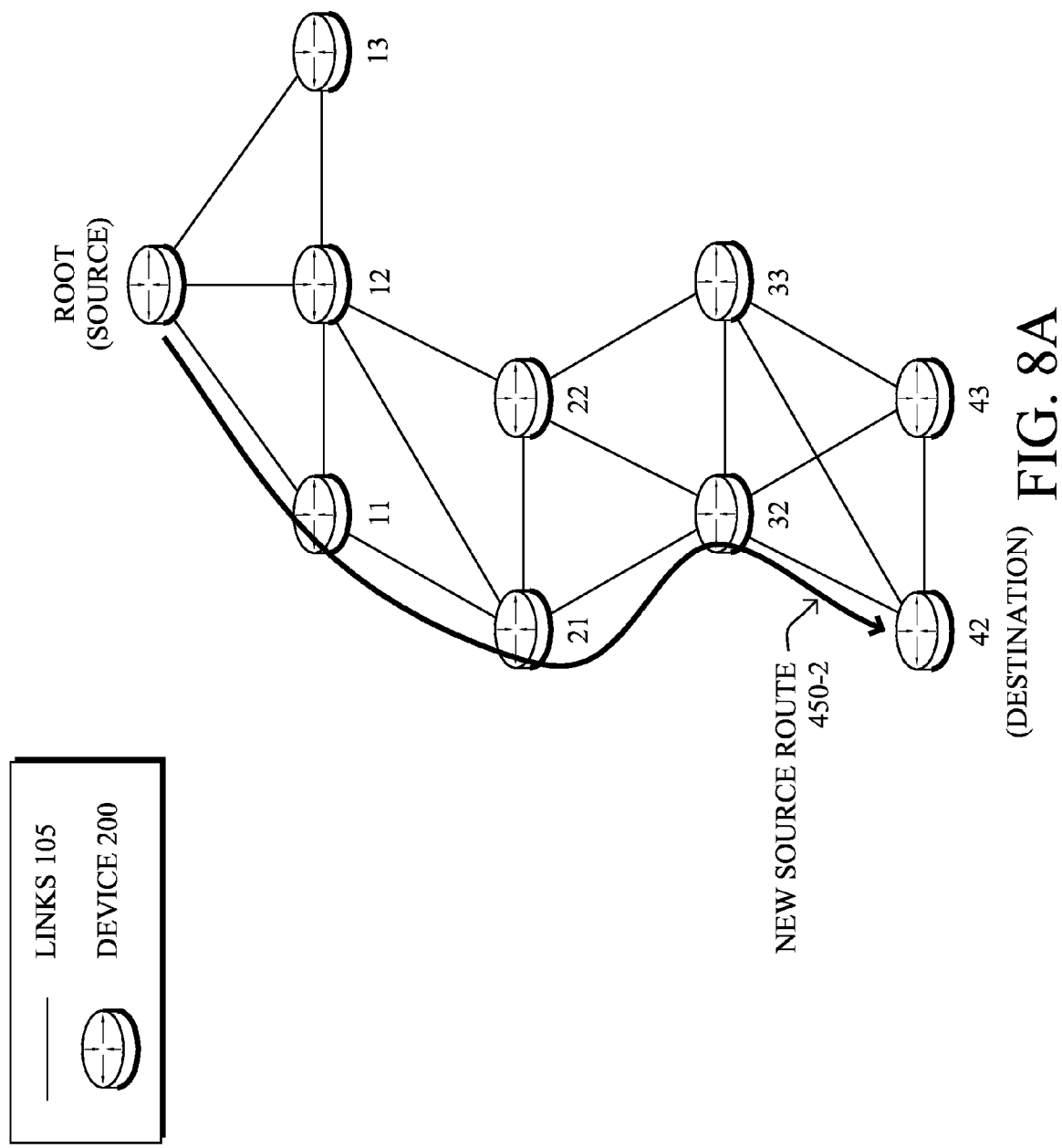
FIGS. 8A-8B illustrate an example of node-diverse path forwarding.
Figure 8B:
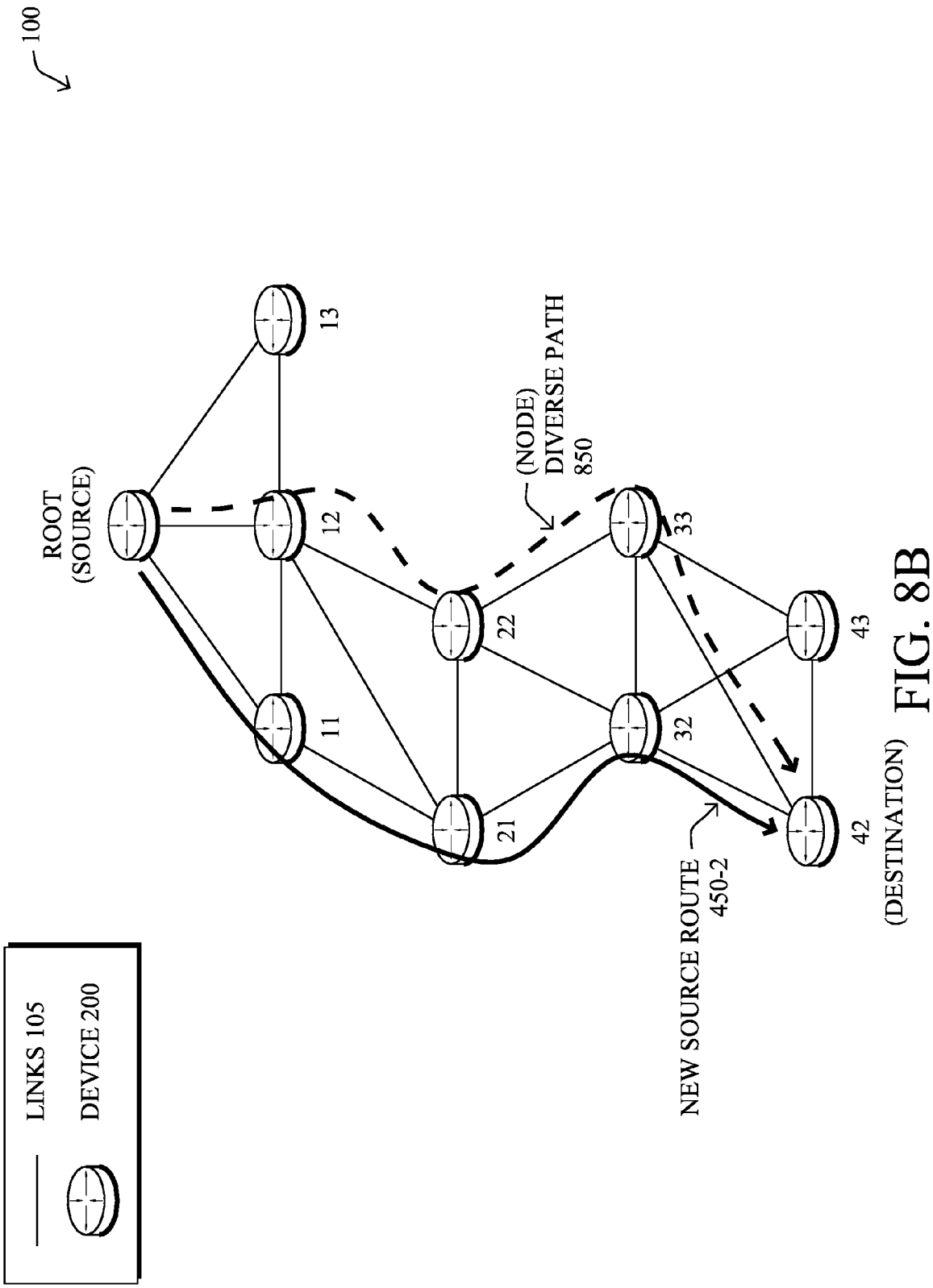

For instance, a link-diverse path 750 is shown above in FIG. 7B above. Had the type field 318 indicated a node-diverse path, however, no solution would be possible given the primary source routed path 450 of FIG. 7A. As shown in FIG. 8A, therefore, the source device may become aware of this fact, and may computer a new source route 450-2, such as based on greater visibility of the network, or else simply based on one or more new attempts to find a source route 450-2 that provides availability of node-diverse paths. As shown in FIG. 8B, the new source route 450-2 may adequately provide for the capability to forward additional packets along a node-diverse path 850, which may be built according to the techniques as described above.

Figure 9:
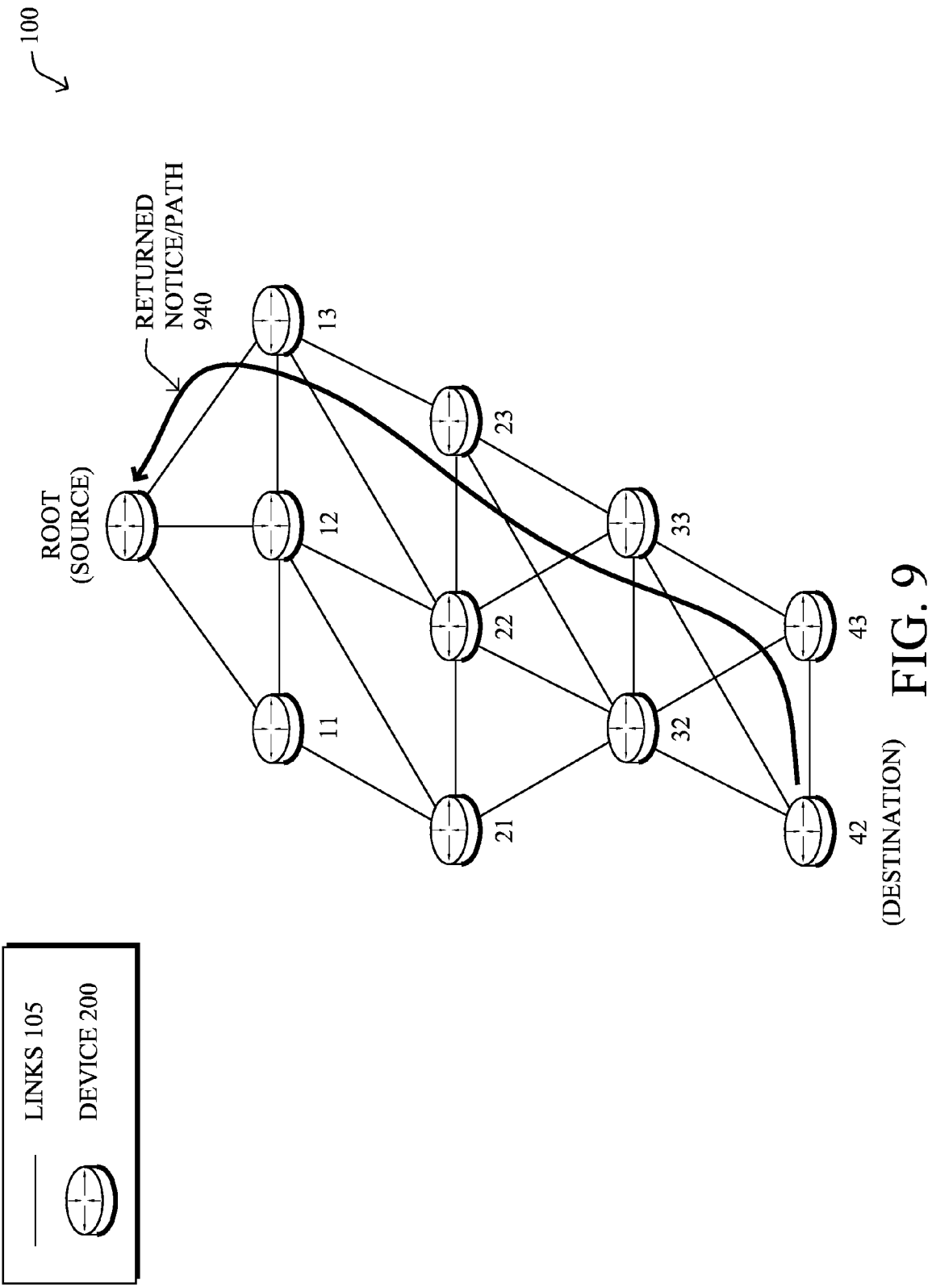
FIG. 9 illustrates an example notification exchange.

According to one or more embodiments herein, the techniques may also provide for the destination device (e.g., node 42) to return to the source device either the sequence values (distinct indicators 316) or recorded paths 314 of the received non-source-routed packets 140-B to indicate how many and what paths were successfully traversed. That is, with reference to FIG. 9, in one embodiment, the destination device may return a notification 940 (notice/path) carrying an identification of one or more of the N indications 316 received at the destination device, and/or a recorded path followed by the one or more of the N packets (e.g., those packets actually received at the destination device). For instance, in one embodiment, the destination device may send the sequence values back to the source device to indicate what sequence values formed valid paths alongside a source route, while in another embodiment, the destination device may send back the traversed path, if recorded. Note, for example, that the RPL Source Route header already implements a Strict Source Record Route function (recorded path 314), which already provides the traversed path to the last router along a path.

In both of these embodiments, the destination device only receives the packets that successfully traversed the different paths, thus verifying those paths as valid diverse paths. By reporting the number and identity (sequence number) of packets received, the source device can determine whether to adjust the number N, such as to decrease the number of copies (to reduce network load), or else may trigger neighbor discovery (to improve multi-path forwarding), or may trigger routing updates (to search for different source routes), etc.

Figure 10:
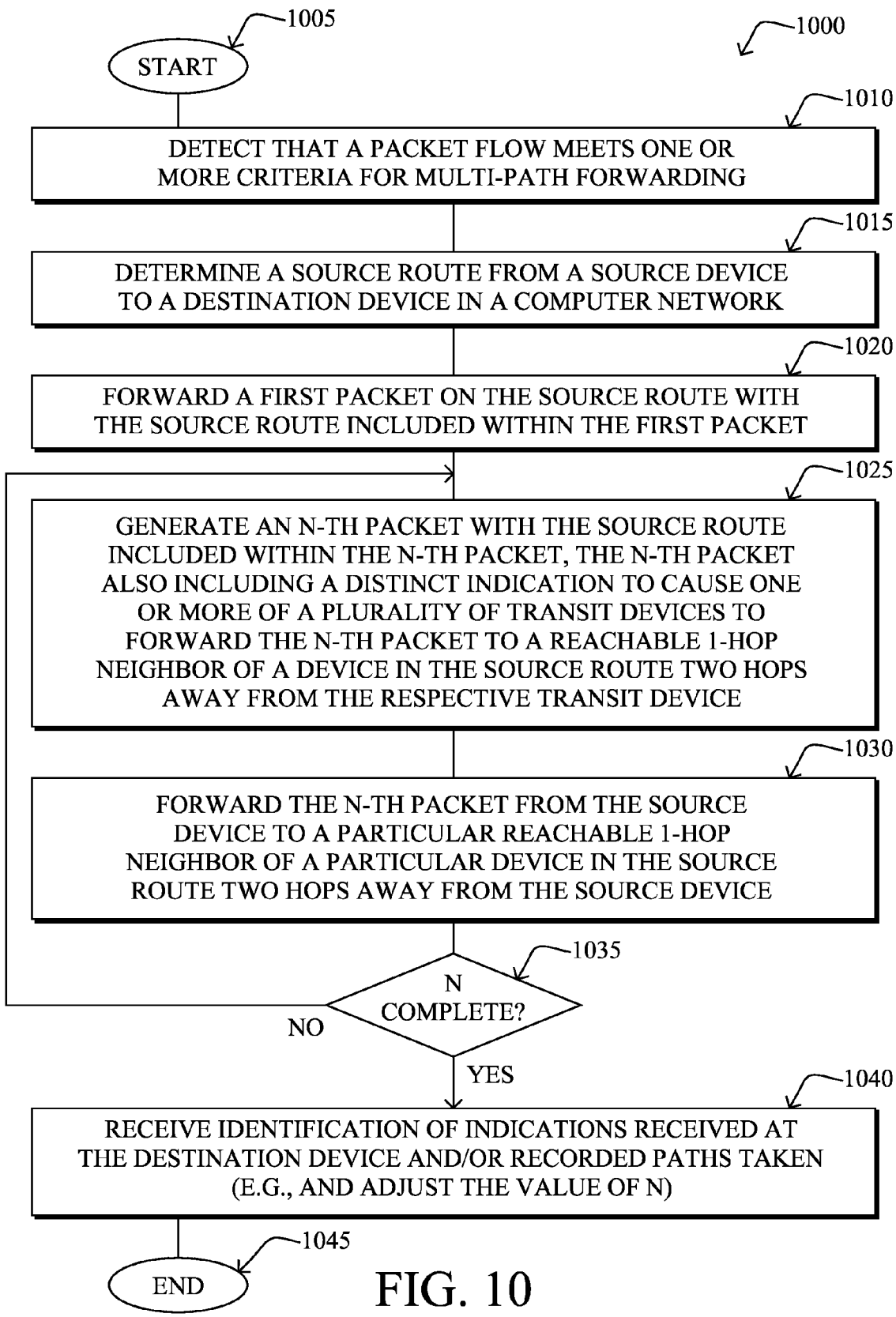
FIG. 10 illustrates an example simplified procedure for diverse path forwarding using a single source route in a computer network, particularly from the perspective of a source device.

FIG. 10 illustrates an example simplified procedure for diverse path forwarding using a single source route in a computer network in accordance with one or more embodiments described herein, particularly from the perspective of a source device. The procedure 1000 may start at step 1005, and continues to step 1010, where, as described in greater detail above, a source device, e.g., a root device as shown above, or else any other arbitrary node/device 200 in the network 100, may optionally first detect that a packet flow meets one or more criteria for multi-path forwarding. In step 1015, the source device determines a source route 450 from itself to a destination device (e.g., node 42) in a computer network 100. As such, in step 1020, the source device may forward a first packet 140-A on the source route (e.g., to node 12) with the source route (312) included within the first packet, and optionally the indication 316 as well.

In step 1025, the source device may also generate an N-th packet (e.g., a second packet 140-B) with the source route included in field 312, and also a distinct indication 316 to cause one or more of a plurality of transit devices to forward the N-th packet to a reachable 1-hop neighbor of a device in the source route two hops away from the respective transit device, as described in detail above. Accordingly, in step 1030, the source device may also forward the N-th packet to a particular reachable 1-hop neighbor of a particular device in the source route two hops away from the source device (e.g., forwarding packet 140-B to node 13, a 1-hop neighbor of node 22, which is on the source route and two hops away from the source device).

This continues via step 1035 until all of the N packets have been sent, at which time in step 1040, in certain embodiments (and assuming any of the routes/paths were successful), where the source device may receive identification of indications received at the destination device and/or recorded paths taken, as described above. As also mentioned above, based on the received notifications 940, the source device may further adjust the value of N in step 1040. The procedure 1000 illustratively ends in step 1045.

Figure 11:
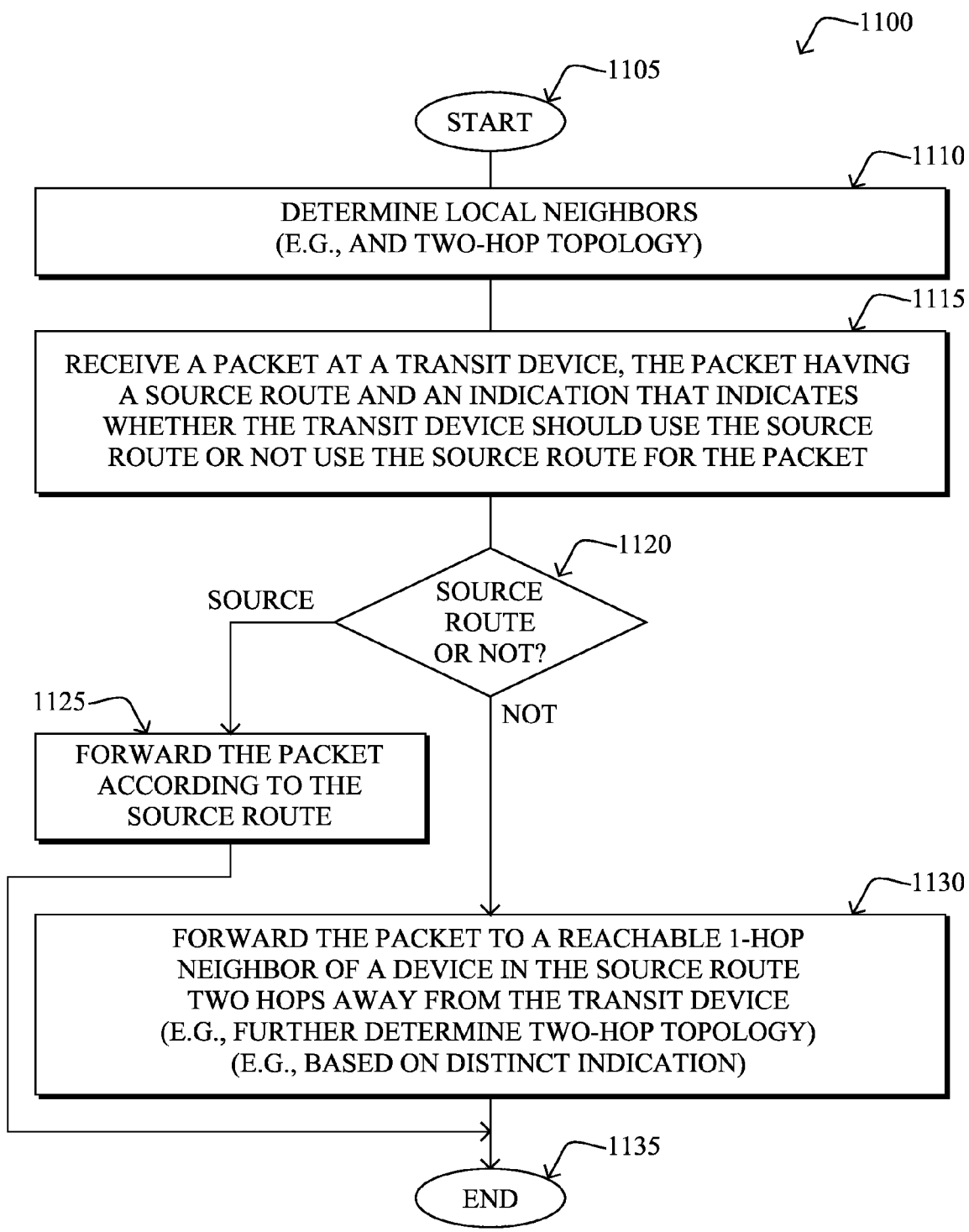
FIG. 11 illustrates another example simplified procedure for diverse path forwarding using a single source route in a computer network, particularly from the perspective of a transit device.

In addition, FIG. 11 illustrates another example simplified procedure for diverse path forwarding using a single source route in a computer network in accordance with one or more embodiments described herein, particularly from the perspective of a transit device. The procedure 1100 may start at step 1105, and continues to step 1110, where, as described in greater detail above, the transit device (e.g., node 12 or node 13) may determine local neighbors based on one or more routing protocol techniques, and may, in certain embodiments, extend that discovery to include a two-hop topology, as mentioned above. In step 1115, the transit device may receive a packet 140, where the packet has a source route 312 and an indication 316 that indicates whether the transit device should use the source route or not use the source route for the packet, as determined in step 1120. In response to the indication indicating that the packet is to use the source route, then in step 1125 the transit device may simply forward the packet according to the source route (e.g., node 12 forwarding to node 22).

Conversely, in response to the indication indicating that the packet is to not use the source route for the packet, then in step 1130 the transit device may forward the packet to a reachable 1-hop neighbor of a device in the source route two hops away from the transit device (e.g., node 13 forwarding to node 23 for diverse path 550). Note that at this time, the transit device may also, in certain embodiments, further determine the two-hop topology, such as through various requests or attempts, as described above. Also note that the selection of which particular neighbor to utilize for the packet may be based on the distinct indication 316 within the packet 140. For instance, as mentioned herein, when a transit device receives "n" packets (all of N or a subset of N) with the source route included within each of the n packets, the transit device may select a corresponding reachable 1-hop neighbor for each of the n packets based on a source of entropy provided by the respective distinct indication.

The procedure 1100 illustratively ends in step 1135, though notably with the option to receive further packets for the same or different flows.

Figure 12:
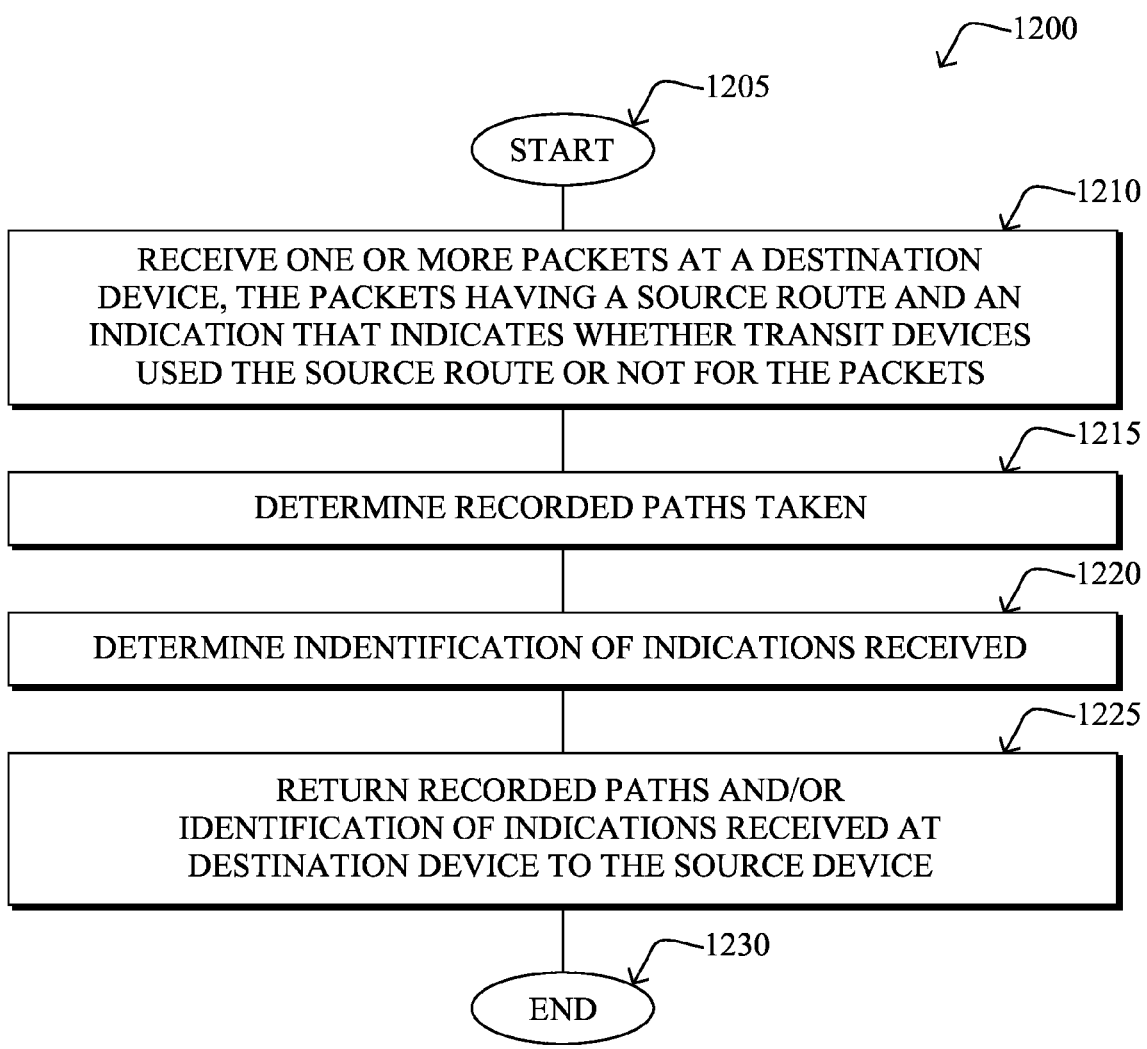
FIG. 12 illustrates still another example simplified procedure for diverse path forwarding using a single source route in a computer network, particularly from the perspective of a destination device.

Lastly, FIG. 12 illustrates still another example simplified procedure for diverse path forwarding using a single source route in a computer network in accordance with one or more embodiments described herein, particularly from the perspective of a destination device. The procedure 1200 may start at step 1205, and continues to step 1210, where, as described in greater detail above, a destination device (e.g., node 42) may receive one or more packets 140, the packets having a source route 312 and an indication 316 that indicates whether transit devices used the source route or not for the packet. As such, the destination device may determine recorded paths 314 taken in step 1215, and/or in step 1220 may also determine identification of indications 316 received. Accordingly, in step 1225, the destination device may return the recorded paths and/or identification of indications received to the source device (e.g., the root node) in notification 940. The illustrative procedure 1200 may then end in step 1230.

It should be noted that while certain steps within procedures 1000-1200 may be optional as described above, the steps shown in FIGS. 10-12 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1000-1200 are described separately, certain steps from each procedure may be incorporated into each other procedure, and the procedures are not meant to be mutually exclusive.

The techniques described herein, therefore, provide for diverse path forwarding using a single source route in a computer network. In particular, by processing a diverse path based on the single source route during the forwarding of the packet, devices can initiate multi-path forwarding without having to wait for a round-trip exchange to discover/compute a new diverse path. The techniques herein thus provide an efficient 1+1 (or 1:1) protection mechanism for use with source routing, as well as a load-balancing mechanism, particularly for LLNs or other networks with limited resources and without requiring off-line computation, regardless of the routing protocol in use. As such, the techniques increase the reliability for critical packets in source routing networks, and are particularly suited for constrained networks.

While there have been shown and described illustrative embodiments that provide for diverse path forwarding using a single source route in a computer network, it is to be understood that various other adaptations and modifications may be made within the spirit and scope of the embodiments herein. For example, the embodiments have been shown and described herein with relation to LLNs, and to particular source routing protocols (e.g., RPL, DSR, etc.). However, the embodiments in their broader sense are not as limited, and may, in fact, be used with other types of networks and/or protocols that use source routing, distance vector or not.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   determining, at a source device, a source route from a source device to a destination device in a computer network;
   forwarding, by the source device, a first packet on the source route with the source route included within the first packet;
   generating, by the source device, a second packet with the source route included within the second packet, the second packet including an indication to cause a transit device in the computer network receiving the second packet to:
      forward the second packet to a neighbor device of the transit device, the neighbor device reachable from the transit node receiving the second packet and one hop away from at least one device along the source route, and
      wherein the at least one device along the source route is two hops away from the transit device receiving the second packet, the at least one device along the source route part of a plurality of devices along the source route; and
   forwarding the second packet from the source device to the transit device to create an on-demand diverse path for the second packet to traverse as the second packet is being forwarded to the destination, wherein each transit node along the created on-demand diverse path is one hop away from one or more of nodes along the source route.

2. The method as in claim 1, further comprising:
   generating and forwarding N packets with the source route included within each of the N packets, each of the N packets also including a distinct indication to cause one or more of a plurality of transit devices to forward the respective packet of the N packets along the on-demand diverse path.

3. The method as in claim 2, wherein the distinct indications provide a source of entropy to selection of the reachable 1-hop neighbor by a particular transit device in the event the particular transit device receives more than one of the N packets.

4. The method as in claim 2, further comprising:
   determining the number N from a network management device.

5. The method as in claim 2, further comprising:
   receiving, at the source device from the destination device, an identification of one or more of the N indications received at the destination device.

6. The method as in claim 5, further comprising:
   adjusting the number N based on the one or more of the N indications received at the destination device.

7. The method as in claim 1, further comprising:
   receiving, at the source device from the destination device, a recorded path followed by the second packet to create the on-demand diverse path.

8. The method as in claim 1, wherein the first packet also includes a default indication to cause all transit devices of the source route to forward the first packet according to the source route.

9. The method as in claim 1, wherein the indication instructs the transit device to select the neighbor device based on one of either link-diversity or node-diversity from the source route.

10. The method as in claim 1, further comprising:
    detecting that a packet flow corresponding to the first packet meets one or more criteria for multi-path forwarding, wherein the second packet is generated in response to the multi-path forwarding.

11. The method as in claim 10, wherein the one or more criteria is load-balancing different packets of the flow; providing redundancy protection for the first packet by the second packet; or responding to a specific application to provide multi-path forwarding.

12. The method as in claim 1, further comprising:
    receiving another packet at the source device as a transit device for the another packet, the another packet having another source route and another indication;
    in response to the another indication indicating that the another packet is to use the another source route, forwarding the another packet according to the another source route; and
    in response to the other indication indicating that the another packet is not to use the another source route, forwarding the another packet to a neighbor of a device in the other source route that is two hops away from the source device as a transit device, one hop from the device in the other source route, and is reachable from the source device as the transit device.

13. A method, comprising:
    receiving a packet at a transit device, the packet including within a source route and an indication that indicates whether the transit device should use the source route or not use the source route for the packet;
    in response to the indication indicating that the packet is to use the source route, forwarding the packet according to the source route; and
    in response to the indication indicating that the packet is to not use the source route for the packet, creating an on-demand diverse path for the packet to traverse to the destination by forwarding the packet to a neighbor device, wherein the neighbor device is one hop from a device in the source route and is reachable from the transit device,
    wherein the device in the source route is two hops away from the transit device, and
    wherein each transit node along the created on-demand diverse path is one hop away from one or more of nodes along the source route.

14. The method as in claim 13, further comprising:
    receiving N packets with the source route included within each of the N packets, each of the N packets also including a distinct indication; and
    selecting a corresponding neighbor device to which each of the N packets is forwarded based on a source of entropy provided by the respective distinct indication.

15. The method as in claim 14, further comprising:
    utilizing the respective distinct indication as one of a) an index into a sorted list of valid 1-hop neighbors, b) a hash input wherein a hash output indexes into the sorted list of valid 1-hop neighbors, or c) a cached indication/1-hop-neighbor pair wherein each distinct indication is paired with a distinct 1-hop neighbor.

16. The method as in claim 13, wherein the indication instructs the transit device to select the neighbor device based on one of either link-diversity or node-diversity from the source route, in response to the indication indicating that the packet is to not use the source route for the packet.

17. The method as in claim 13, further comprising:
determining which local neighbors of the transit device are reachable by the transit device, are one hop away from the device in the source route two hops away from the transit device by one of either a) received advertisements from the local neighbors, b) responses to specific requests to the local neighbors, or c) by trying each local neighbor one at a time wherein if a local neighbor is not one hop away from any device in the source route two hops away from the transit device then the local neighbor returns an error message to the transit device.

18. The method as in claim 13, further comprising:
determining another source route from the transit device as another source device to another destination device in the computer network;
forwarding a first packet on the another source route with the another source route included within the first packet;
generating a second packet with the another source route included within the second packet, the second packet also including another indication to cause one or more of a plurality of other transit devices to forward the second packet to another neighbor device of another device in the another source route two hops away from the respective other transit device; and
forwarding the second packet from the transit device as the source device to another particular neighbor device of another particular device in the source route two hops away from the transit device as the source device, the another particular neighbor device one hop from the another particular device in the source route two hops away from the transit device as the source device.

19. An apparatus, comprising:
one or more network interfaces to communicate in a computer network;
a processor coupled to the network interfaces and adapted to execute one or more processes; and
a memory configured to store a process executable by the processor, the process when executed operable to:
determine a source route from the apparatus as a source device to a destination device in the computer network;
forward a first packet on the source route with the source route included within the first packet;
generate a second packet with the source route included within the second packet, the second packet including an indication to cause a transit device in the computer network receiving the second packet to:
forward the second packet to a neighbor device of the transit device, the neighbor device reachable from the transit node receiving the second packet and one hop away from at least one device along the source route, and
wherein the at least one device along the source route is two hops away from the transit device receiving the second packet, the at least one device along the source route part of a plurality of devices along the source route; and
forward the second packet from the source device the transit device to create an on-demand diverse path for the second packet to traverse as the second packet is being forwarded to the destination, wherein each transit node along the created on-demand diverse path is one hop away from one or more of nodes along the source route.

20. An apparatus, comprising:
one or more network interfaces to communicate in a computer network;
a processor coupled to the network interfaces and adapted to execute one or more processes; and
a memory configured to store a process executable by the processor, the process when executed operable to:
receive a packet at the apparatus as a transit device, the packet including within a source route and an indication that indicates whether the transit device should use the source route or not use the source route for the packet;
in response to the indication indicating that the packet is to use the source route, forwarding the packet according to the source route; and
in response to the indication indicating that the packet is to not use the source route for the packet, creating an on-demand diverse path for the packet to traverse to the destination by forwarding the packet to a neighbor device, wherein the neighbor device is one hop from a device in the source route and is reachable from the transit device,
wherein the device in the source route is two hops away from the transit device, and
wherein each transit node along the created on-demand diverse path is one hop away from one or more of nodes along the source route.

21. A tangible, non-transitory, computer-readable media having software encoded thereon, the software, when executed by a processor on an apparatus, operable to:
receive a packet at the apparatus as a transit device, the packet including within a source route and an indication that indicates whether the transit device should use the source route or not use the source route for the packet;
in response to the indication indicating that the packet is to use the source route, forwarding the packet according to the source route; and
in response to the indication indicating that the packet is to not use the source route for the packet, creating an on-demand diverse path for the packet to traverse to the destination by forwarding the packet to a neighbor device, wherein the neighbor device is one hop from a device in the source route and is reachable from the transit device,
wherein the device in the source route is two hops away from the transit device, and
wherein each transit node along the created on-demand diverse path is one hop away from one or more of nodes along the source route.

22. The computer-readable media as in claim 21, wherein the software when executed is further operable to:
determine another source route from the apparatus as another source device to another destination device in the computer network;
forward a first packet on the another source route with the another source route included within the first packet;
generate a second packet with the another source route included within the second packet, the second packet also including another indication to cause one or more of a plurality of other transit devices to forward the second packet to another neighbor device of another device in the another source route two hops away from the respective other transit device; and forward the second packet from the apparatus as the source device to another particular neighbor device of another particular device in the source route two hops away from the transit device as the source device, the another particular neighbor device one hop from the another particular device in the source route two hops away from the transit device as the source device.

* * * * *

UNITED STATES PATENT AND TRADEMARK OFFICE
CERTIFICATE OF CORRECTION

PATENT NO. : 9,270,584 B2  
APPLICATION NO. : 13/406823  
DATED : February 23, 2016  
INVENTOR(S) : Jonathan W. Hui et al.

Page 1 of 1

It is certified that error appears in the above-identified patent and that said Letters Patent is hereby corrected as shown below:

In the Specification

In Column 8, Line 67, please amend as shown:  
herein the packet may include the multi-path forwarding In Column 11, Line 9, please amend as shown:  
sequence value) to thus provide a source of entropy to help In Column 11, Line 32, please amend as shown:  
neighbors. In one embodiment, as shown in FIG. 6A, devices Signed and Sealed this  
Twenty-sixth Day of January, 2021

Drew Hirshfeld  
*Performing the Functions and Duties of the*  
*Under Secretary of Commerce for Intellectual Property and*  
*Director of the United States Patent and Trademark Office*